United States Patent [19]

Crain et al.

[11] Patent Number: 4,538,221
[45] Date of Patent: Aug. 27, 1985

[54] APPARATUS AND METHOD FOR MIXING A PLURALITY OF SUBSTANCES

[75] Inventors: Stephen F. Crain; Steven H. Gray; Edward P. Arnold; Timothy J. Dodd, all of Duncan, Okla.

[73] Assignee: Halliburton Company, Duncan, Okla.

[21] Appl. No.: 483,001

[22] Filed: Apr. 6, 1983

[51] Int. Cl.$^3$ .................. G06F 15/46; G05D 11/13
[52] U.S. Cl. .................. 364/172; 137/101.19; 137/88; 222/52; 364/502; 364/510; 364/189; 366/152
[58] Field of Search ............... 364/172, 180, 188, 189, 364/502, 509, 510, 479; 222/1, 52, 55, 57; 137/3, 88, 101.19, 101.21, 268; 366/151, 152

[56] References Cited

U.S. PATENT DOCUMENTS

| | | | |
|---|---|---|---|
| Re. 18,063 | 5/1931 | Steinhauer | 222/178 |
| 2,024,478 | 12/1935 | Short | 137/101.19 |
| 2,658,644 | 11/1953 | Lowe | 222/52 |
| 2,704,173 | 3/1955 | Edwards | 222/136 |
| 2,873,036 | 2/1959 | Noble | 214/2 |
| 3,027,099 | 3/1962 | Ludwig | 241/33 |
| 3,041,049 | 6/1962 | Tarukawa | 259/9 |
| 3,053,577 | 9/1962 | Ungashick | 408/67 |
| 3,115,278 | 12/1963 | Mylting | 222/56 |
| 3,181,482 | 5/1965 | Heth et al. | 107/4 |
| 3,219,046 | 11/1965 | Waugh | 137/8 |
| 3,245,584 | 4/1966 | Linville | 222/57 |
| 3,270,921 | 9/1966 | Nadolske et al. | 222/136 |
| 3,329,313 | 7/1967 | Mayer | 222/56 |
| 3,410,293 | 11/1968 | Ernyei | 137/112 |
| 3,452,774 | 7/1969 | Stanton | 137/101.19 |
| 3,475,392 | 10/1969 | McCoy et al. | 137/3 |
| 3,481,544 | 12/1969 | Jackson | 239/130 |
| 3,536,235 | 10/1970 | Holzhauer et al. | 222/273 |
| 3,558,017 | 1/1971 | Soojian et al. | 222/342 |
| 3,605,775 | 9/1971 | Zaander et al. | 137/3 |
| 3,606,903 | 9/1971 | Porter et al. | 137/88 |
| 3,609,316 | 9/1971 | Brosset et al. | 364/479 |
| 3,721,253 | 3/1973 | Remke | 137/3 |
| 3,807,602 | 4/1974 | Meichsner | 222/1 |
| 3,822,809 | 7/1974 | Foucault et al. | 222/71 |
| 3,843,099 | 10/1974 | Duncan | 259/23 |
| 3,964,793 | 6/1976 | Volpeliere | 222/55 |
| 4,111,272 | 9/1978 | Ricciardi et al. | 177/50 |
| 4,111,335 | 9/1978 | Arva et al. | 222/57 |
| 4,111,336 | 9/1978 | Ward et al. | 222/58 |
| 4,209,258 | 6/1980 | Oakes | 366/152 |
| 4,265,266 | 5/1981 | Kierbow et al. | 137/101.19 |
| 4,345,612 | 8/1982 | Koni et al. | 137/554 X |
| 4,353,482 | 10/1982 | Tomlinson et al. | 222/1 |

FOREIGN PATENT DOCUMENTS

| | | |
|---|---|---|
| 637629 | 3/1962 | Canada. |
| 2626411 | 12/1977 | Fed. Rep. of Germany. |
| 1064761 | 4/1967 | United Kingdom. |
| 667957 | 6/1979 | U.S.S.R. |

Primary Examiner—Joseph Ruggiero
Attorney, Agent, or Firm—E. Harrison Gilbert, III; Joseph A. Walkowski; Thomas R. Weaver

[57] ABSTRACT

A portable apparatus for controlling the production of a mixture of a fluid and a plurality of additives utilizes a unified control panel having all of the necessary controls compactly contained in a single housing for providing both automatic and manual control of each of the additive channels through which the additives are mixed with the primary fluid. The control of each additive channel is achieved through a software controlled algorithm by which errors are only incrementally, rather than totally, applied to prior drive signals at any one time.

10 Claims, 24 Drawing Figures

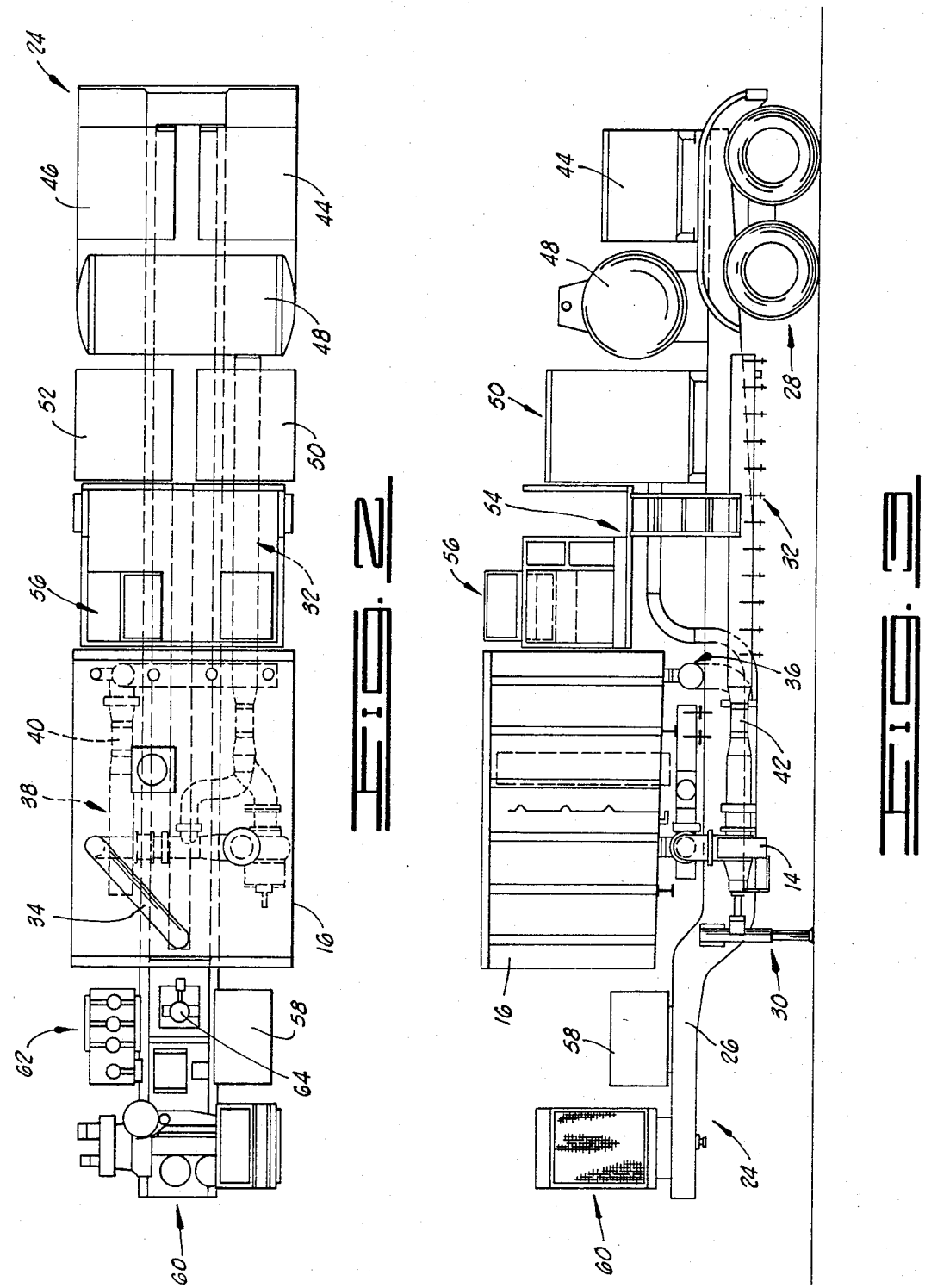

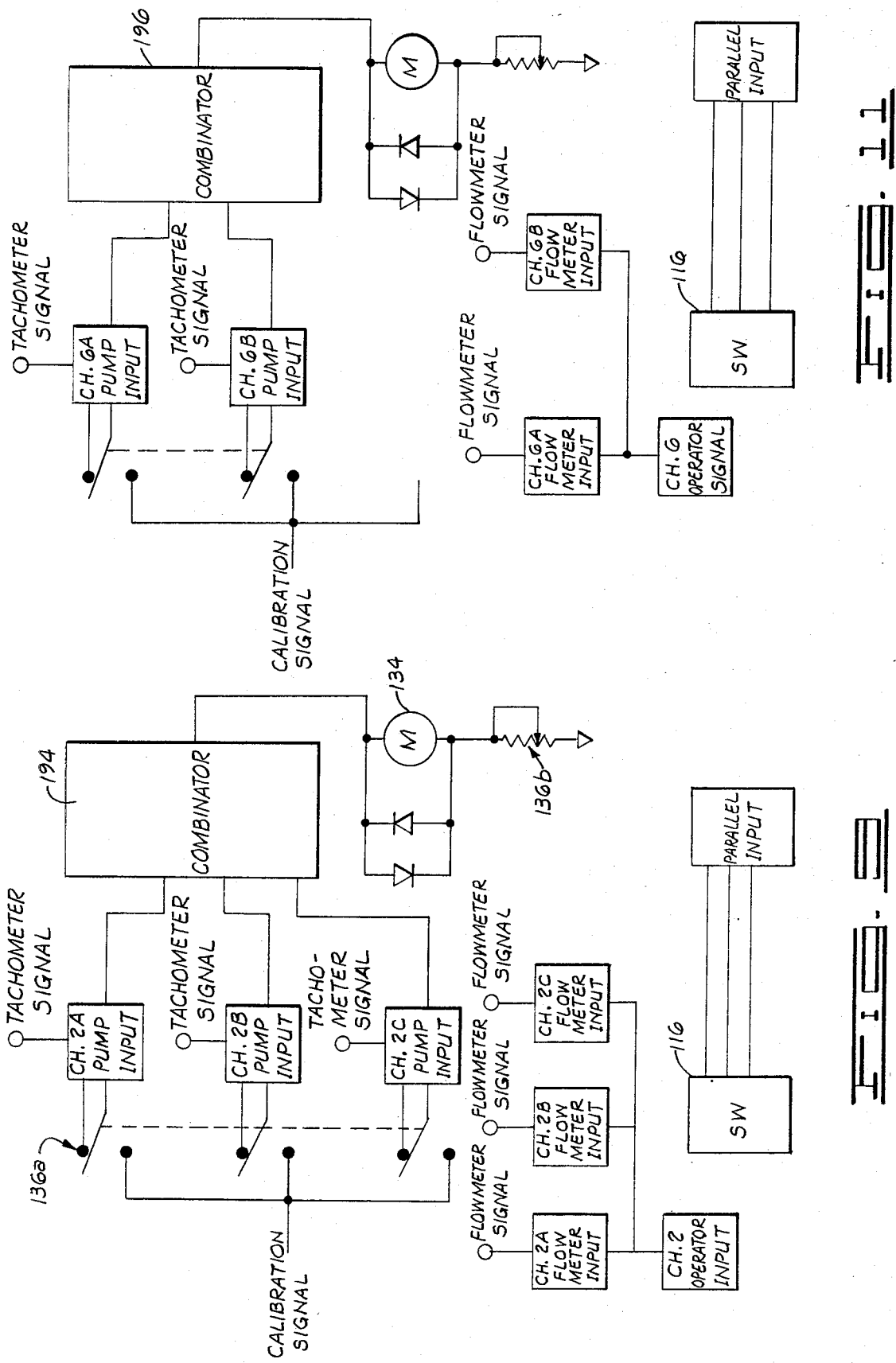

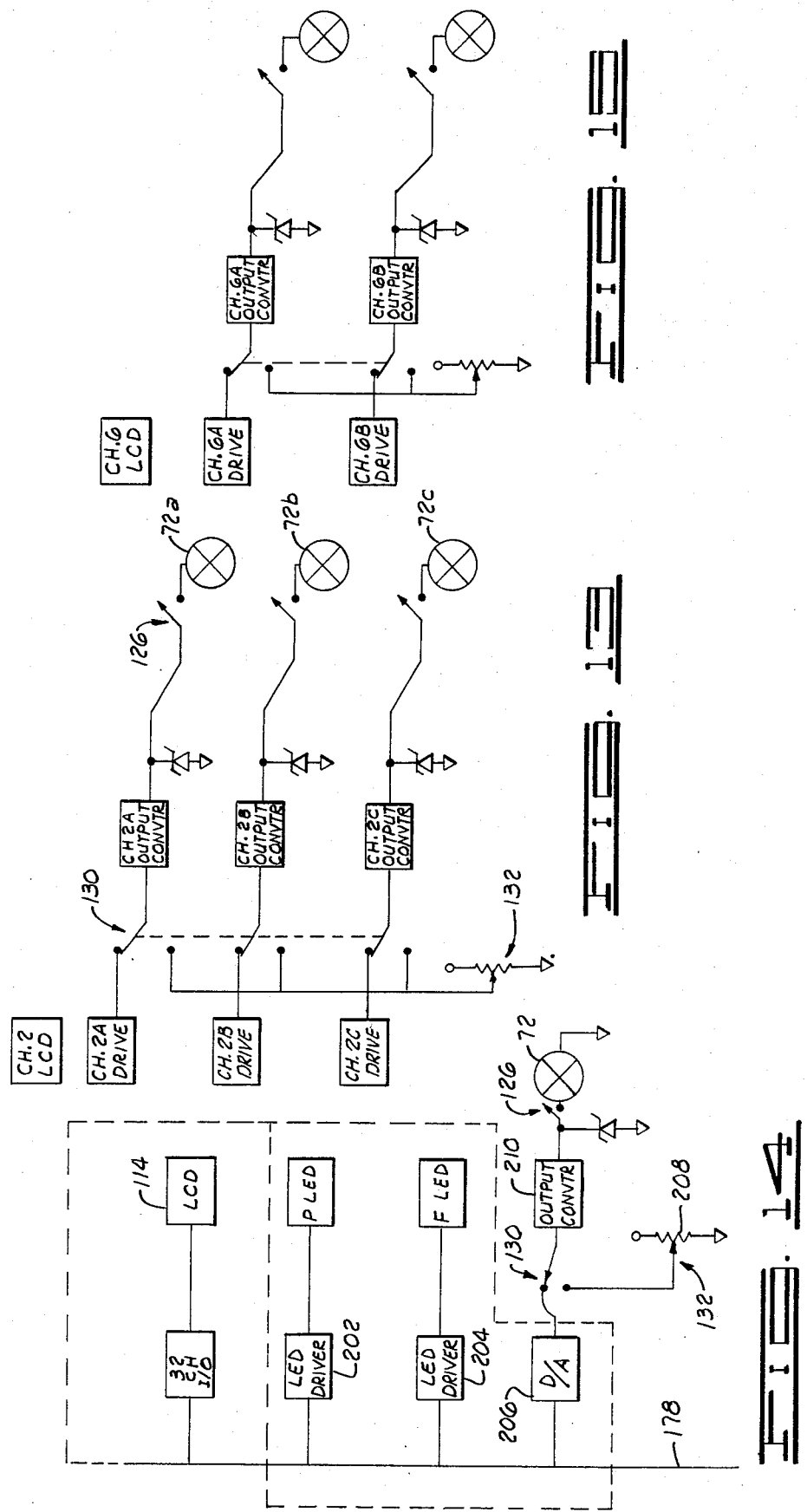

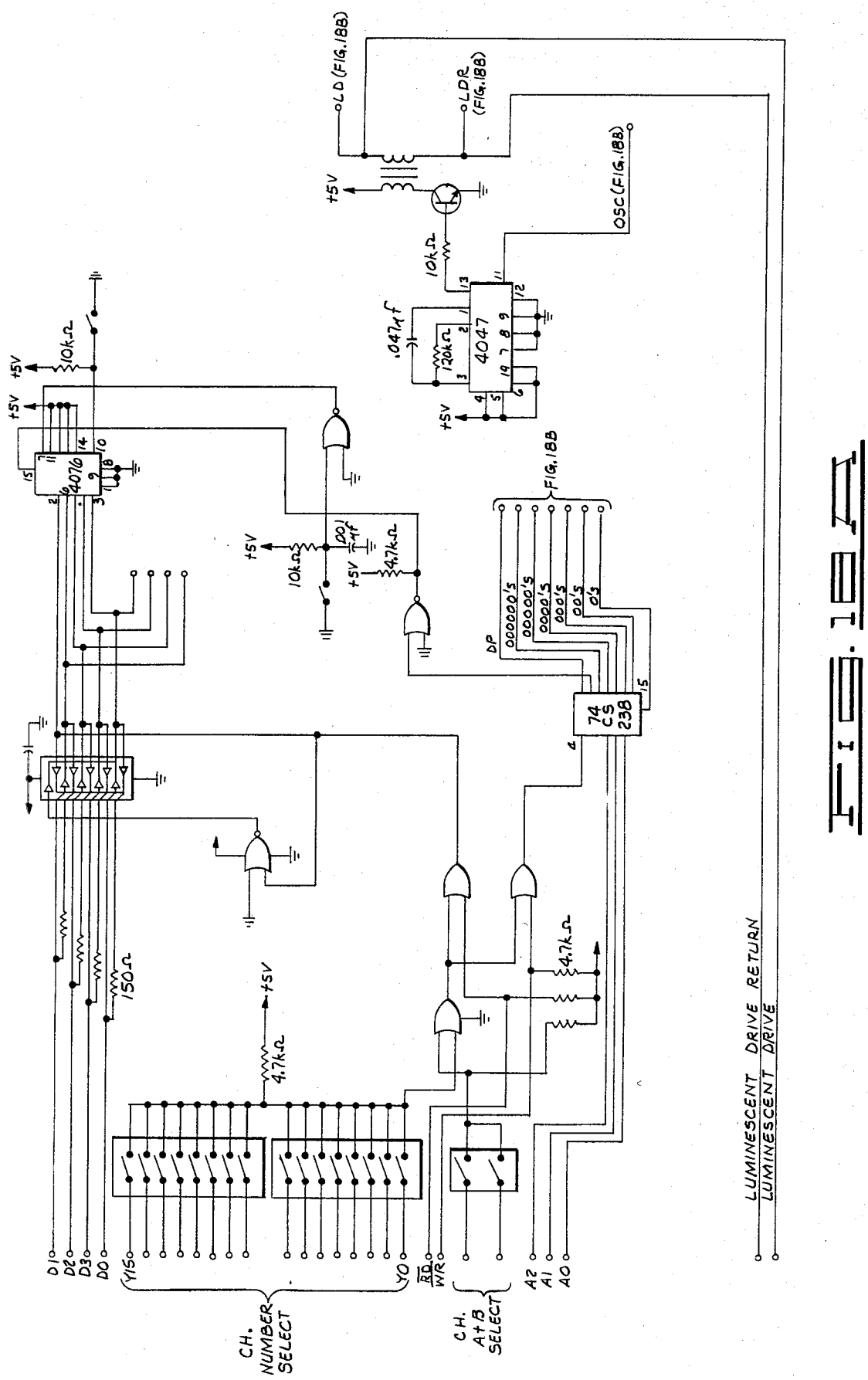

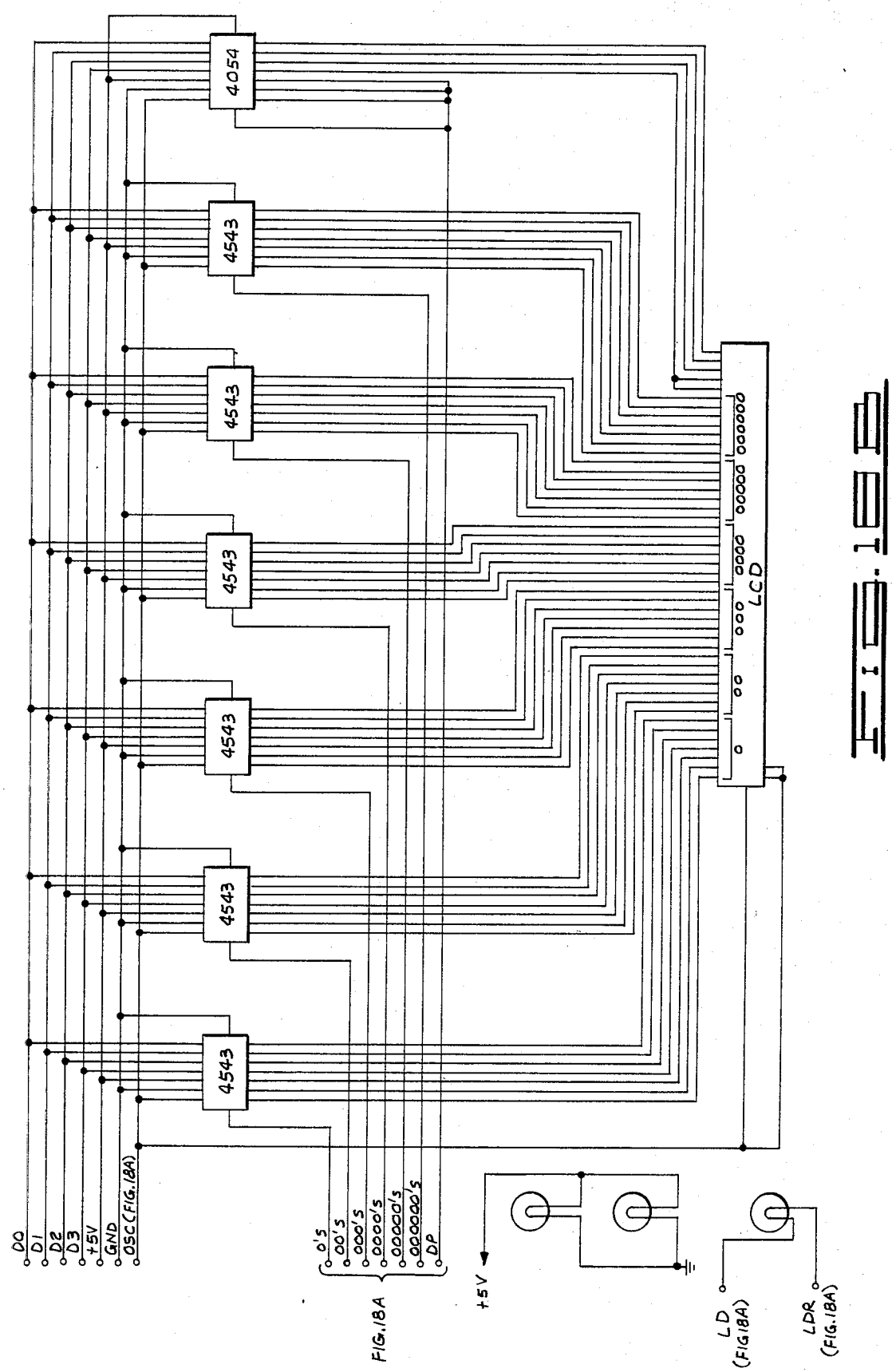

APPARATUS AND METHOD FOR MIXING A PLURALITY OF SUBSTANCES

This invention relates generally to apparatus and methods for mixing a plurality of substances and, more particularly, but not by way of limitation, to a liquid gel concentrate continuous blending trailer having an electrical control system located thereon for controlling the production of a fracturing gel.

The necessity for the proper control of the blending of substances used in the drilling and completing of oil or gas wells has been recognized as set forth in U.S. Pat. No. 4,353,482 to Tomlinson et al. It is also known that additive substances used in the oil and gas industry can be contained on and transported by a portable trailer as disclosed in U.S. Pat. No. 4,265,266 to Kierbow et al. Despite the recognition of these needs and the disclosures of apparatus to meet these needs, there has arisen a more specific need for an improved self-contained portable unit and method which control the preparation of a fracturing fluid containing a liquid gel concentrate. With such an apparatus and a method for controlling the preparation of a fracturing fluid, the considerable time spent pre-gelling a job can be decreased, the running time and associated wear on blenders can be reduced, and waste (and the costs associated therewith) can be cut. Additionally, viscosity, which is important to the ability of the fluid to carry sand, can be carefully controlled.

The improved self-contained unit and method should be able to satisfy three basic criteria:

1. mix a liquid gel concentrate, and preferably other additives (such as a buffering agent), with water to form a fully yielded gel capable of carrying high sand concentrations;

2. store liquid chemical additives in bulk quantities in a closed system; and 3. meter additional additives with a minimum of hand manipulation and error.

The first criterion requires an apparatus and method for drawing water from a water source, adding liquid gel concentrate and other necessary chemicals, and then allowing sufficient holding time for the gel to fully yield. The mixture is to be held until it has fully yielded so that very high sand concentrations can be added in a blender tub into which the mixture is pumped. To allow the mixture to fully yield, there is the need for a holding tank having a sufficient capacity to meet the flow rate at which the mixture is to be pumped while allowing adequate reaction time. However, it is also desirable for the holding tank to hold only a minimum mixture so that in the event of a premature sandout, for example, only a minimum amount of mixture will need to be discarded.

The second criterion of bulk storage of liquid chemical additives is needed for containing surfactants, clay stabilizing agents, cross-linking agents, breakers, pH control (buffering) agents and other additives. By maintaining these substances in bulk on the self-contained unit, spillage waste from drums will be eliminated, on-location labor requirements will be decreased, and bulk purchasing economies will be allowed.

Maintaining bulk quantities on the self-contained unit in a closed system reduces safety hazards which can arise from handling 55-gallon drums in which the additives would frequently otherwise be maintained. For example, formic acid, which is used in oil and gas well operations, is a particularly hazardous chemical to handle under field conditions. By utilizing a closed system having a bulk tank reduces the potential for inadvertent human contact with the formic acid.

The use of a closed bulk storage system on the self-contained unit also minimizes wastes which would otherwise likely occur if individual storage drums were used. For example, with a closed system, no pumps or lines need to be flushed; therefore, the residue chemicals which would otherwise be flushed are not lost. Additionally, when individual drums are used, significant monetary loss occurs if the entire drum contents are not used because each gallon of additive can cost from $20.00 to $50.00, for example. A self-contained closed system can also prevent waste by allowing more accurate inventory control of the chemicals.

The third criterion of metering additional additives with a minimum of hand manipulation and error necessitates a suitable metering system capable of metering various flows in response to different master flows without the continual monitoring by an operator. Accurate control of each of these additives must be continually maintained because of fluctuations in the master and additive flows. If exclusively manual metering were used, these fluctuations could result in a gel that is not fully yielded, thereby resulting in the blender tub sanding out or the pumping system being damaged, because the manual operation would likely not be able to achieve the necessary response.

There is a need for such an apparatus to include a unified control panel so that field personnel can readily and conveniently control the mixing and blending of several substances at one time. Such a unified control panel will also permit enhanced space utilization by providing a relatively compact unit which includes a manual control back-up system.

There is also the need for a unified control panel which includes alternative data entry means for concurrently setting up alternative flow rate determining parameters so that quick control changeovers can be made.

There is the further need for a control system which has thermostatically controlled heating and cooling means to maintain proper electronic operating temperatures in harsh environments.

There is yet an additional need for an improved control algorithm by which additive metering error control is performed in manually selectable increments to reduce the chances of overdamped or underdamped control.

With an improved apparatus and method which meets the aforementioned needs, a proper fracturing fluid can be obtained within a reduced time.

The present invention meets the aforementioned needs by providing a new and improved apparatus and method for mixing a plurality of substances. The present invention provides an apparatus and method for producing a fracturing gel from a liquid gel concentrate, a buffering agent and water. Other additives can also be included. This is accomplished by metering the additives into a water stream, thoroughly mixing the substances, and pumping them into a holding tank to allow the mixture to properly react and yield (e.g., by hydration of the gelling agent in the liquid gel concentrate). The fully yielded mixture is then pumped into a blender tub from which a flow into a well is achieved. The present invention is also capable of adding further additives to the mixture as it passes from the blender tub into the well. The present invention includes the necessary control means for properly metering the additives into their respective primary flows, such as the mixture flow into the holding tank and the flow from the holding tank to the blender tub.

Broadly, the present invention provides an apparatus comprising conduit means for providing a path for a primary flow, additive means for flowing a substance into the conduit means for mixing with the primary flow, first detector means for detecting a rate of the primary flow, and second detector means for detecting a rate of the substance when the additive means flows the substance into the conduit means. The apparatus also includes control means, responsive to the first detector means and the second detector means, for controlling the additive means. The control means includes a unified control panel comprising a channel control sector that includes first data entry means for manually entering a first data number specifying a first magnitude of an additive substance flow rate determining parameter for use by the control means in controlling the additive means and also includes second data entry means for manually entering a second data number specifying a second magnitude of the additive substance flow rate determining parameter for use by the control means in controlling the additive means.

The control means further includes means for selectably directing the control means to utilize either the first data number or the second data number in controlling the additive means.

The second detector means includes means for detecting a speed at which the additive means is operating and means for detecting a flow rate of the substance which is flowed by the additive means. One of these two detecting means is used by the control means for controlling the additive means.

The control means further includes automatic means for automatically controlling the additive means in response to the first detector means, the second detector means and the selected one of the first or second data numbers. The control means also includes manual means for controlling the additive means in response to the first detector means and an electrical signal provided by a variable resistance means. Either the automatic means or the manual means can be selected to control, at any one time, the additive means.

The apparatus further comprises temperature means for controlling the temperature of the control means and pH detecting means for detecting the pH of a mixture resulting from the addition of the substance to the primary flow.

The method of the present invention for controlling the addition of the substance to the primary flow includes the steps of storing a concentration value in a random access memory, converting a first voltage into a first digitally encoded number indicating the actual flow rate of the primary flow, converting a second voltage into a second digitally encoded number indicating the actual flow rate of the substance, using the concentration value and first digitally encoded number to define a product representing a desired flow rate at which the substance is to be added to the primary flow, using the product and the second digitally encoded number to define a scaled difference representing an error between the actual flow rate of the substance and the desired flow rate of the substance, manually entering a factor having a magnitude less than one, multiplying the error by the factor, and adding the control error to a drive signal for providing an adjusted drive signal to the apparatus which is flowing the substance at an adjusted speed for incrementally adjusting the actual flow rate of the substance toward the desired flow rate.

Therefore, from the foregoing, it is a general object of the present invention to provide a new and improved method and apparatus for mixing a plurality of substances. Other and further objects, features and advantages of the present invention will be readily apparent to those skilled in the art when the following description of the preferred embodiment is read in conjunction with the accompanying drawings.

FIG. 2 is a top plan view of the preferred embodiment of the apparatus of the present invention.

FIG. 3 is a side elevational view of the apparatus of the present invention shown in FIG. 2.

FIG. 8 is a schematic illustration of the channel 1 input and output signal flow of the preferred embodiment control system.

FIG. 9 is a schematic illustration of the channel 2 input signal flow of the preferred embodiment control system.

FIG. 13 is a schematic illustration of the channel 2 output signal flow of the preferred embodiment control system.

FIG. 14 is a schematic illustration of the output signal flow for one of the channels 3, 4, 5, 8, 9 and 10 of the preferred embodiment control system.

FIG. 16 is a schematic illustration of the pH input, UART input/output, and option switchboard input/output signal flows of the preferred embodiment control system.

FIGS. 17A-D are schematic circuit diagrams of the dual flow rate digital interface circuitry for the preferred embodiment control system.

FIGS. 18A-B are schematic circuit diagrams of the liquid crystal display panel meter decoder and displays for the preferred embodiment control system.

Figure 19:
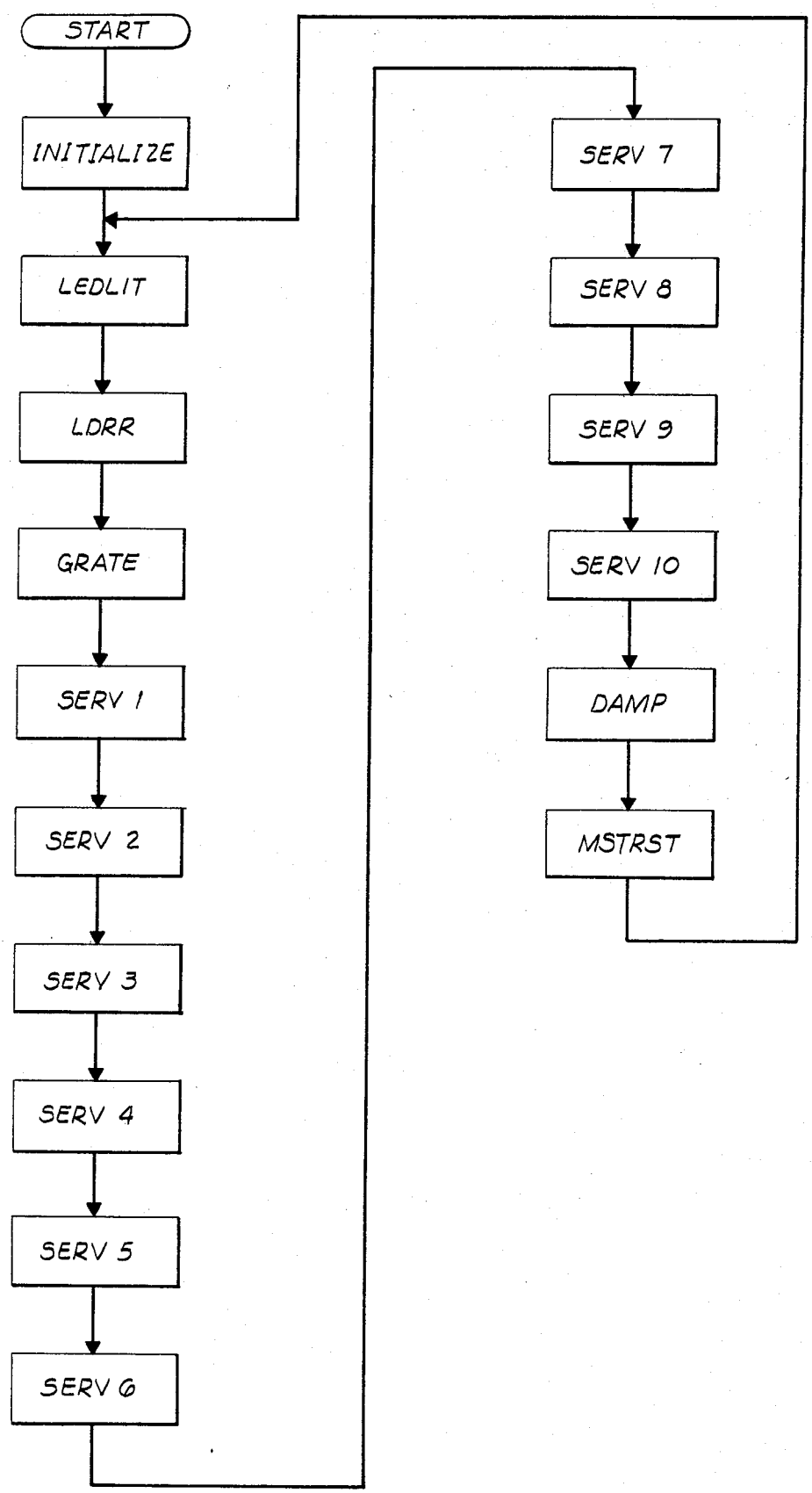

FIG. 19 is a flow chart of the main loop program of the preferred embodiment control system.

Figure 20:
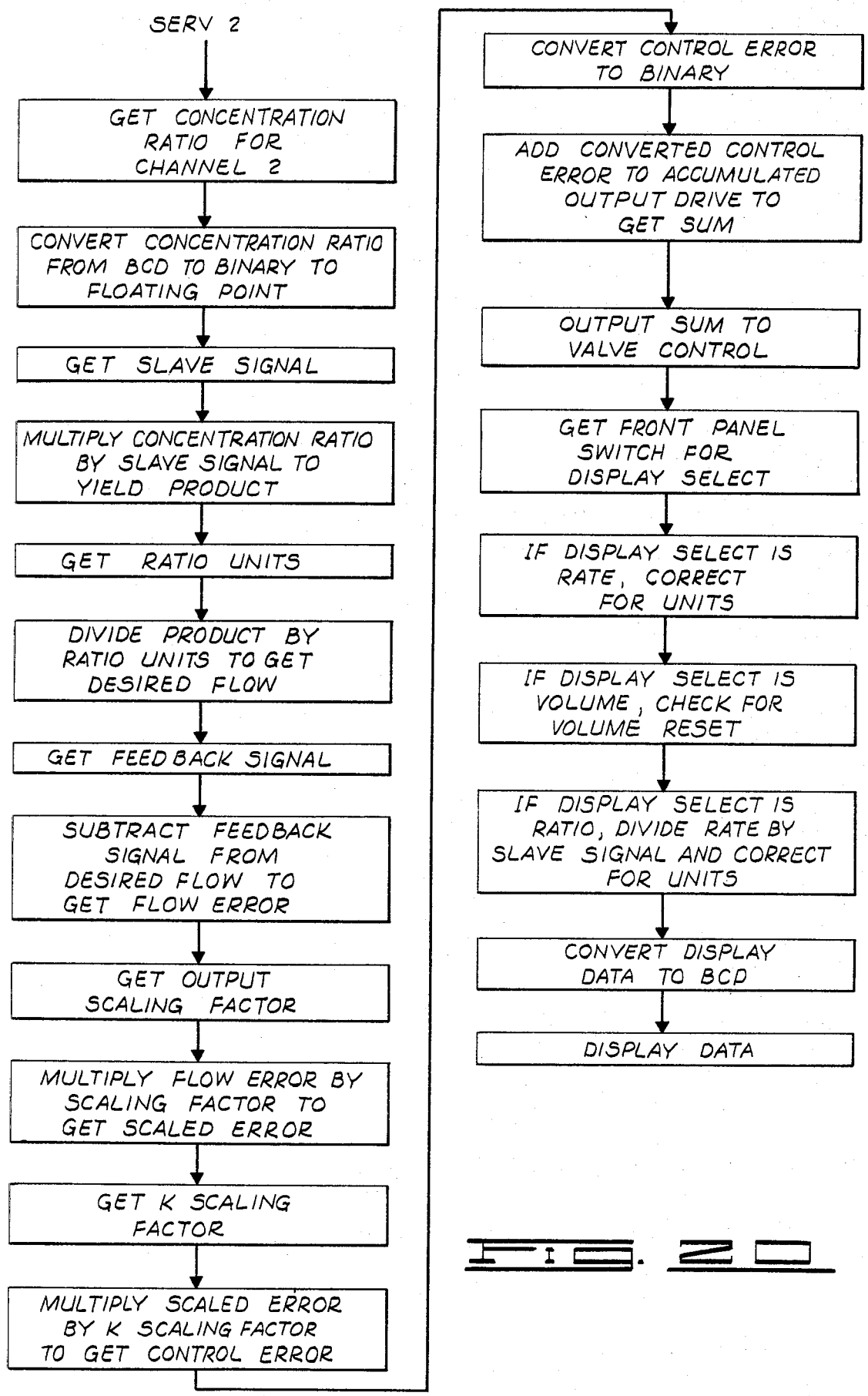

FIG. 20 is a flow chart of the subroutine SERV2 shown in FIG. 19.

Figure 1:
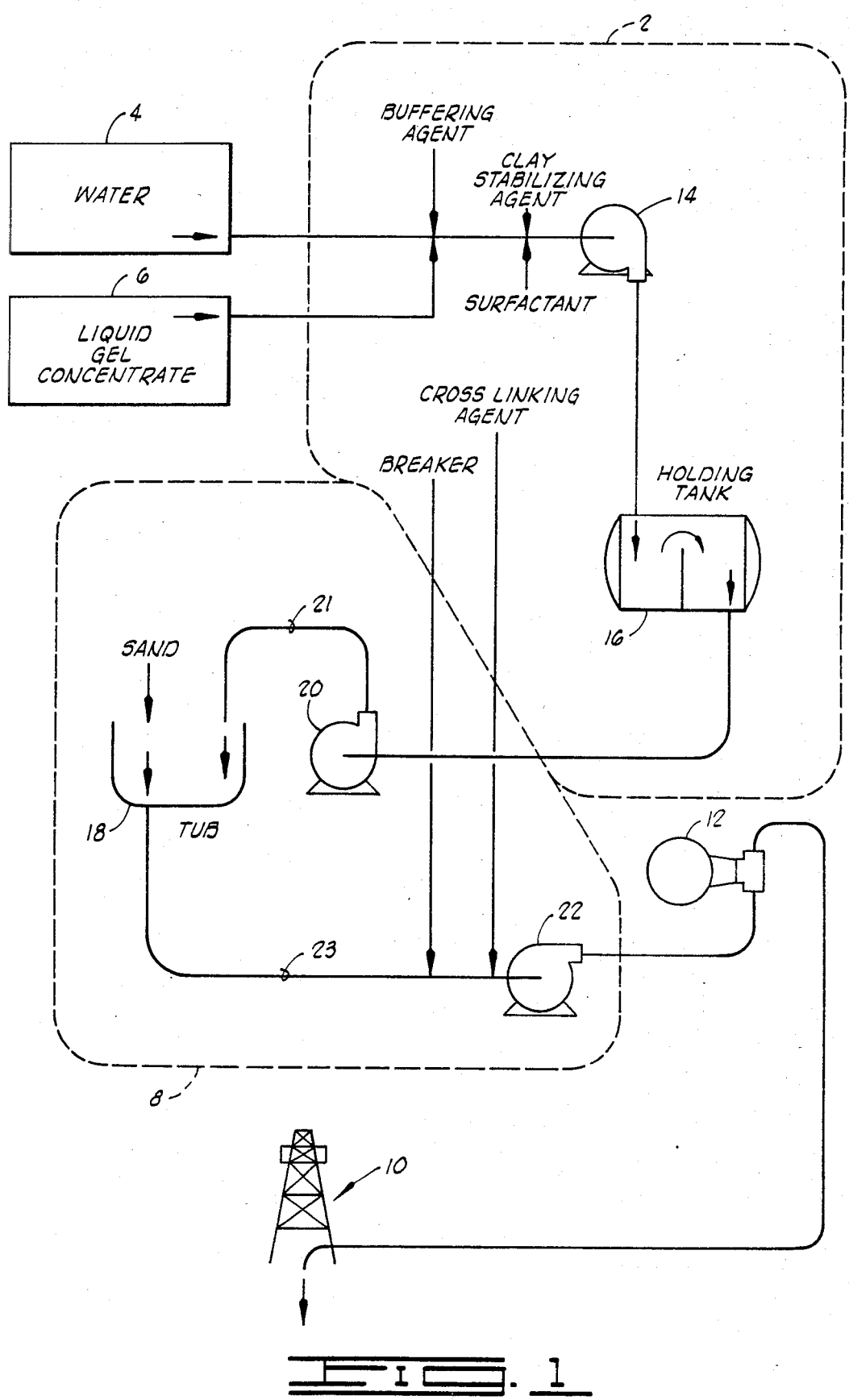
FIG. 1 is a schematic flow diagram of the preferred embodiment of the present invention shown associated with a water source, a liquid gel concentrate source, a blender, and a well.

With reference to the drawings, the preferred embodiment of the present invention will be described. FIG. 1 shows that the preferred embodiment includes an apparatus 2 which receives water from a water source 4 and a liquid gel concentrate from a liquid gel concentrate source 6. The apparatus 2 provides a mixture and additives to a blender apparatus 8 from which the completed fracturing fluid is pumped into a well 10 by a pump 12, such as a Halliburton HT-400 pump.

The apparatus 2 includes a main pump 14, such as a 10×10 Gorman-Rupp centrifugal pump, for pumping water and additives into a holding tank 16. The additives which are added into the flow established by the pump 14 include the liquid gel concentrate, a buffering agent, a clay stabilizing agent, and a surfactant of types known to the art. Examples of these substances include formic acid, BA-1, CLA-STA II, and FRACFLO. All these additives, other than the liquid gel concentrate, are maintained on the apparatus 2 in suitable containers.

The mixture pumped into the holding tank 16 is held in the holding tank for a suitable period to enable the mixture to react, such as by hydration of the gelling agent in the liquid gel concentrate, to provide a suitably yielded fracturing gel. After being held for the appropriate time, the mixture is then pumped from the holding tank 16 into a blender tub 18 of the blender apparatus 8. Sand is added to this mixture in the blender tub 18, and the resultant sand-laden mixture is pumped from the blender tub 18 for injection into the well 10. The sand-laden mixture can have additional additives added from the apparatus 2 as indicated in FIG. 1. These additional additives are shown in FIG. 1 to be a cross-linking agent and a breaker. These are retained in suitable containers on the apparatus 2. Examples of these substances include CL-11 and MYF-3C. As known to the art, it is important that the cross-linking agent and the breaker not be added to the mixture until the mixture is pumped into the well 10.

The water source 4 includes any suitable water supply which can be connected to the apparatus 2. For example, the water source 4 can include a plurality of frac tanks. For one type of job on which the apparatus can be used, it is contemplated that ten frac tanks be used to provide a 200,000 gallon reservoir of water suitable for fracturing fluid flow rates of fifteen to sixty-three barrels per minute.

The liquid gel concentrate source 6 is an appropriate source of a suitable liquid gel concentrate which can be connected to the apparatus 2. For example, liquid gel concentrate transports of types known to the art can be used.

The blender apparatus 8 illustrated in FIG. 1 is a standard blender trailer known to the art. As shown in FIG. 1, the blender apparatus 8 includes the blender tub 18 into which the mixture from the holding tank 16 is pumped by a pump 20 through an inlet line 21. The sand-laden mixture prepared in the blender tub 18 is pumped to the pump 12 by another pump 22, through an outlet line 23, also contained on the blender apparatus 8.

The apparatus 2 and the method by which the fracturing fluid is produced by the preferred embodiment of the present invention will be more fully described with reference to FIGS. 2-12.

With reference to FIGS. 2 and 3, the broad structural aspects of the preferred embodiment of the present invention will be described. FIGS. 2 and 3 disclose that the apparatus 2 includes a portable support means comprising a trailer 24 having a platform 26 mounted on a plurality of wheels 28 at the rear and on a support member 30 at the front of the trailer. The trailer 24 can be transported by suitable means as known to the art.

Mounted on the trailer 24 is the pump 14. The pump 14 is part of an inlet conduit means for providing a flow path to the holding tank 16 which is also mounted on the trailer 24. The inlet conduit means of the preferred embodiment extends from a suction header 32 to which the water source 4 is connectible by suitable means. The suction header 32 is connected to a holding tank inlet manifold 34 through which the mixture comprising the water and additives is input into the holding tank 16.

Once in the holding tank 16, the mixture, after a suitable reacting time, is flowed out of the holding tank 16 through a tank outlet manifold 36 shown in FIG. 3. The tank outlet manifold 36 connects to a discharge header 38 shown in FIG. 2. A flow meter 40 is disposed in the outlet conduit means provided by the tank outlet manifold 36 and the discharge header 38. The blender apparatus 8 is connectible to the discharge header 38 as known to the art.

A flow meter 42 is disposed in the inlet conduit means defined by the suction header 32, the pump 14, and the holding tank inlet manifold 34.

Also mounted on the trailer 24 are the plurality of containers for holding the various liquid additives. In the preferred embodiment shown in FIGS. 2 and 3, the containers include two 293-gallon vertical rectangular liquid additive tanks 44 and 46, a 500-gallon horizontal cylindrical liquid additive tank 48, and two 549-gallon vertical rectangular liquid additive tanks 50 and 52. These containers are mounted on the rear of the trailer 24 as shown in FIGS. 2 and 3.

Mounted just forward of the tank bank comprising the tanks 44-52, is an operator's platform 54 on which a unified control panel of a control system is mounted in a single housing 56. The control system will be more particularly described hereinbelow with reference to FIGS. 4-20.

Also shown in FIGS. 2 and 3 to be mounted on the trailer 24 are a fuel tank 58 which contains fuel for powering a diesel engine 60. Also mounted on the trailer 24 are a hydraulic reservoir 62 and a blower primer 64.

Figure 4:
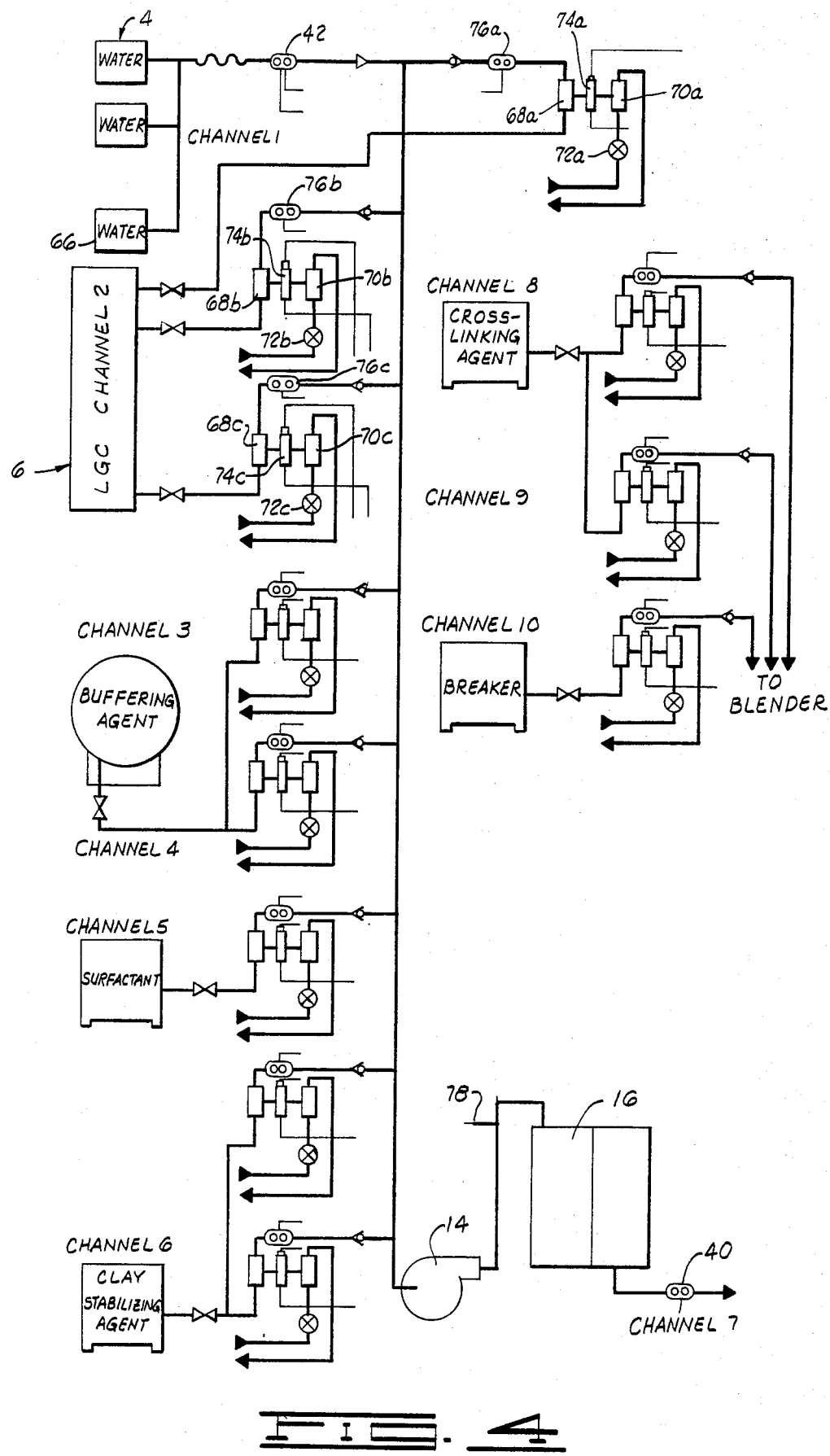
FIG. 4 is a functional block diagram and flow chart of the preferred embodiment of the control system of the preferred embodiment apparatus of the present invention.

With reference to FIG. 4, the fluid flow and control interrelationships of various elements of the apparatus 2 will be described. FIG. 4 discloses that the control system includes ten channels of additive means for flowing the additives into a water flow to create, in the preferred embodiment, the fracturing fluid or gel to be pumped downhole into the well 10.

Channel one is the channel which supervises the flow of water from a plurality of frac tanks 66. The flow from the frac tanks 66 is effected by means of the pump 14. The flow of the water is detected by the flow meter 42.

Channel two supervises the addition of the liquid gel concentrate from the liquid gel concentrate source 6. In the illustrated preferred embodiment, channel two includes three subchannels through which the liquid gel concentrate can be flowed into the flowing water established by the pump 14. Each subchannel of channel two includes an additive means comprising a chemical positive displacement pump 68 driven by a hydraulic motor 70 whose operation is regulated by an electro-hydraulic control valve 72 (the specific elements for the channel two subchannels are designated with the letters "a," "b," or "c"). Each set of these elements constitutes an additive pump means by which the additive can be flowed into the inlet conduit means through which the water is flowed.

To detect the speed at which one of the motors 70 drives the associated pump 68, the control system also includes a tachometer 74 associated with the drive shaft coupling the motor 70 and the pump 68. The control system also includes a flow meter 76 in each channel or subchannel for detecting a flow of the additive pumped by the pump 68 into the inlet conduit means. The pump means is constructed of elements as known to the art.

Channels three through ten are constructed similarly to each subchannel of the channel two (i.e., each includes a pump 68, a motor 70, a valve 72, a tachometer 74 and a flow meter 76). It is to be noted that in the preferred embodiment shown in FIG. 4, channels three and four provide a buffering agent, whereas channels five and six provide other additives, such as surfactants and clay stabilizing agents. These additives are of types as known to the art, such as formic acid, FRAC-FLO, and CLA-STA II. In channel six there are two subchannels as shown in FIG. 4.

Channel seven monitors the flow of the mixture from the holding tank 16 to the blender apparatus 8. Channels eight, nine and ten are used for adding substances to the mixture pumped from the blender tub 18 by means of the pumps 12 and 22. Examples of these substances are MYF-3C, CL-11, and a suitable breaker as known to the art.

FIG. 4 also discloses that a means for detecting the pH of the mixture flowing into the holding tank 16 is disposed in the discharge line of the pump 14. In the preferred embodiment, this detector means includes a suitable pH probe 78 of the type known to the art, such as a sensor used with the TBI Series 540A pH indicator.

It is to be noted that all of the elements shown in FIG. 4, except for the sources 4 and 6, are mounted on the trailer 24 by suitable means as known to the art. It is also to be noted that the individual elements (e.g., pump 68, tachometers 74) shown in FIG. 4 are of suitable types as known to the art.

Figure 5:
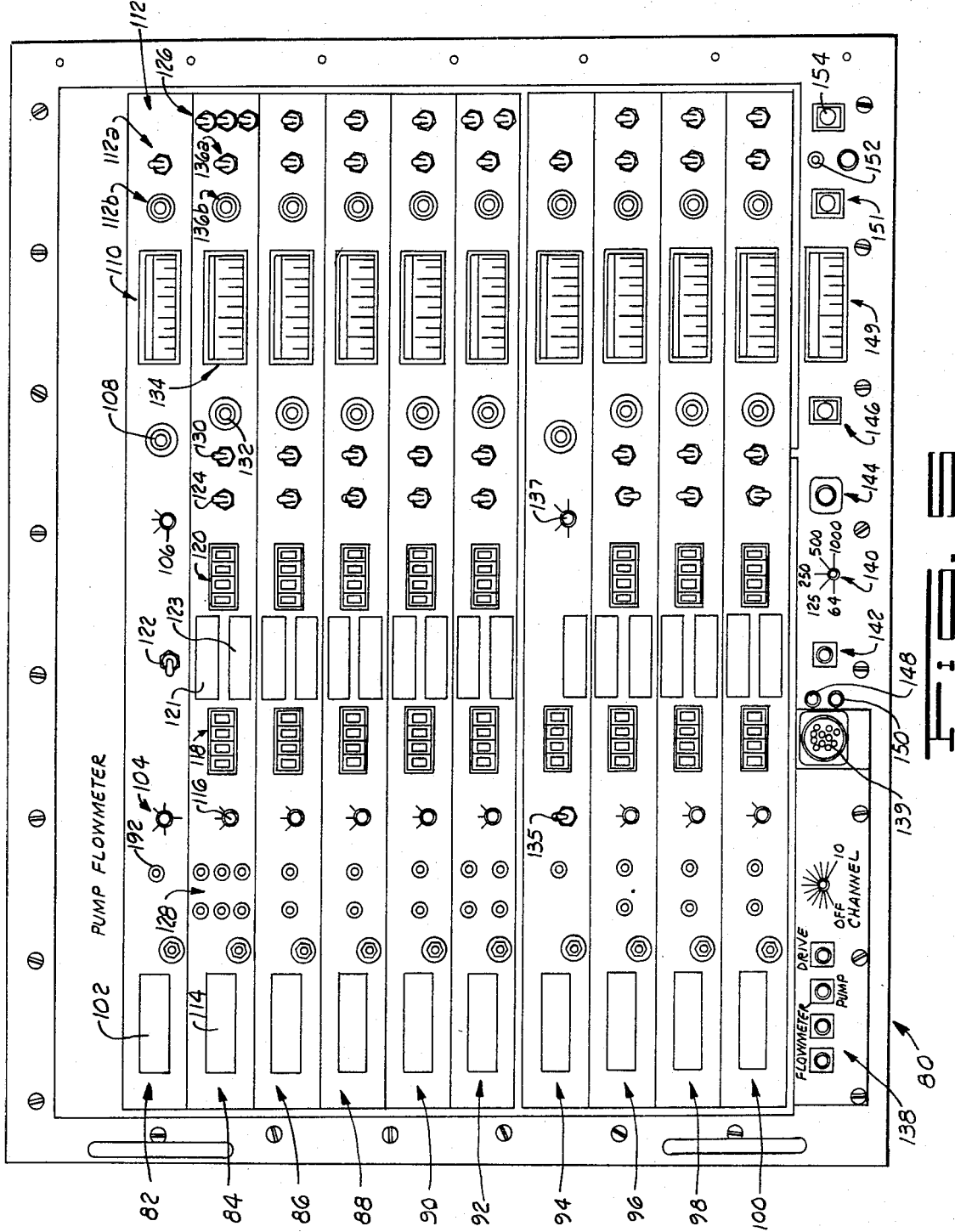
FIG. 5 is a front view of the unified control panel of the preferred embodiment control system of the present invention.

As shown in FIG. 5, the control system for the apparatus 2 has a unified control panel 80, contained within the single housing 56, for providing the interface with the operator of the apparatus 2. The front panel 80 has a plurality of channel control sectors 82-100, each control sector being associated with a respective one of the ten channels described with reference to FIG. 4.

The channel control sector 82 is related to the first channel shown in FIG. 4. The channel control sector 82 includes a six-digit digital display 102 for displaying a selectable one of the volumetric flow of the water, flow rate of the water, the total volumetric flow or the total rate computed by the control system. The number which is shown in display 102 is determined by the control system at least in part in response to the flow meter 42. Which number is to be displayed is selected manually by appropriate actuation of a rotary switch 104 forming another part of the channel control sector 82. Another rotary switch 106 of the channel control sector 82 is used for directing the control system to use the water flow rate, the liquid gel concentrate flow rate, or a simulated flow rate as the primary flow against which the additive flows are to be determined. If a simulated flow rate is to be used, the simulated flow rate is developed by manual operation of a potentiometer having a control knob 108 associated therewith. The channel control sector 82 also includes a match meter indicator 110 having associated calibration switch means 112 associated therewith as known to the art. The calibration switch means 112 includes a toggle switch 112a for placing the channel in either a run or calibrate mode. The calibration switch means 112 also includes a potentiometer control 112b for calibrating the meter 110.

The channel control sector 84 is associated with channel two, the liquid gel concentrate channel. The channel control sector 84 includes a six-digit liquid crystal display 114 by means of which the flow rate, volumetric flow or concentration ratio of the liquid gel concentrate can be visually indicated. Which one of these numbers is displayed is selected by a rotary switch 116. The channel control sector 84 also includes first and second data entry means comprising two thumbwheel switches 118 and 120. By manual manipulation of the thumbwheel switches 118 and 120, two different numbers representing an additive flow rate determining parameter can be entered into the control system. In the preferred embodiment this parameter is the concentration of the additive in the mixture. These concentration values instruct the control system as to how much of the liquid gel concentrate is to be added to the primary flow in response to the detected flow rate of the water or other flow to which the additives are slaved.

The two switches 118 and 120 are not both used by the control system at one time so that one switch can be used to control the current operation of the apparatus while the other switch can be set up for future control in the event a quick change is needed, for example. The changeover between utilization of either the switch 118 or the switch 120 is controlled by a toggle switch 122. It is to be noted that the toggle switch 122 is used to control which stage of each channel control sector is being used by the control system. For example, when the switch 122 is in the stage one position as shown in FIG. 5, the control system is operating from the thumbwheel switch 118 and those directly below it in FIG. 5. When the switch 122 is in the stage two position, the thumbwheel switch 120 and those directly below it are used by the control system.

Disposed between the thumbwheel switches 118 and 120 are label means 121 for indicating which chemical the channel control sector is associated with and label means 123 for indicating the units of concentration for that chemical.

Because each additive channel includes a tachometer 74 and a flow meter 76, the control system can operate off either one of them to control the addition of the respective additive to the primary flow. Which of the two signals is used is selected by proper actuation of a toggle switch 124 included within the channel control sector 84. When a channel includes a plurality of pumps 68, such as in channel two, the channel control sector includes a plurality of switches 126 for selecting which of the pumps is to be used; when a channel has only one pump 68, then only one switch 126 is used.

In response to the selected positions of the switches 124 and 126, an appropriate indicator is illuminated when a minimum flow is detected. As illustrated in FIG. 5, the indicators for the channel control sector 84 include six light-emitting diodes 128 which indicate whether the tachometer or flow meter signal of the pump 68a, 68b, or 68c is indicating a minimum flow.

The aforementioned elements of the channel control sector 84 are used in an automatic mode of the control system whereby the speed at which the pumps 68 pump the liquid gel concentrate into the primary flow is controlled. If it is desired that automatic control is not to be maintained or if there is a malfunction in the automatic mode, the control of channel two can be switched from automatic to manual by means of a toggle switch 130 which is manually positionable in either of two actuation states, one defining an automatic mode of operation and the other defining a manual mode of operation. When the toggle switch 130 is in the automatic mode position, the aforementioned elements are used to control the addition of the liquid gel concentrate to the primary flow. When the switch 130 is in the manual position, a manual mode is entered whereby a manual potentiometer control knob 132, a match meter indicator 134 and match meter calibration control means 136 are used. The calibration control means 136 includes a toggle switch 136a for placing the channel in either a run mode or a calibrate mode. The control means 136 also includes a potentiometer control knob 136b which functions similarly to the control 112b. These elements are used to control the operation of the operative pump or pumps selected by the switches 126. The operation in the manual mode is similar to the operation maintained with the Halliburton Services 79BI control system known to the art.

Each of the remaining channel control sectors is constructed similarly to either the channel control sector 82 or the channel control sector 84. In particular, channel control sectors 86, 88, 90, 92, 96, 98 and 100 are constructed similarly to the channel control sector 84 (except for the number of pumps utilized), and the channel control sector 94 is similar to the channel control sector 82.

The channel control sector 94 is similar to the channel control sector 82 because the channel control sector 94 is associated with the flow from the holding tank 16 into the blender tub 18. This is analogous to the channel one primary flow from the water source 4 into the holding tank 16. As shown in FIG. 5, the channel control sector 94 has a toggle switch 135, instead of the rotary switch 104, for displaying the rate of the mixture flowing from the holding tank 16 to the blender tub 18. The channel control sector 94 also includes a switch 137, analogous to the switch 106, by means of which various inputs (e.g., actual flow or simulated flow) can be used as the master flow which controls the additives associated with channels eight, nine and ten blended with the sand-laden mixture flowing from the blender tub 18 into the well 10.

FIG. 5 discloses that the unifed control panel 80 also includes test means 138 for testing the apparatus 2 in a manner which does not form a part of the claimed present invention.

FIG. 5 still further discloses that the unified control panel 80 includes a connector 139 through which serial communications can be conducted with an external device.

The panel 80 also includes a rotary switch 140 by means of which various frequencies can be selected for calibrating the match meters as known to the art when the switches 112a and 136a are in their calibrate positions. An external output of this frequency signal is provided by means of a suitable connector 142.

A flow meter connector 144 is also provided on the unified control pane 80. This is the input where the signal from the flow meter 40 is connected.

Because the control system of the present invention is contemplated for use in environments where temperature extremes may be encountered, the control system also includes a thermostatically controlled heating and cooling means for controlling the temperature of the electronic components of the control system. The heating or cooling mode of the thermostatically controlled temperature means is made by means of actuation of a switch 146 mounted on the unified control panel 80. When a predetermined temperature has been exceeded within the control system, a light-emitting diode 148 is illuminated and if the temperature extreme is sufficiently great, a light-emitting diode 150 is illuminated indicating that the system has shut down.

Because one of the purposes of the present invention is to provide a control means by which consistent, more reliable fracturing gels can be produced, it is important that the present invention also include a means for detecting the acidity or alkalinity of the mixture. This is achieved by using the pH probe 78 of the pH detector means which also includes a pH indicator meter 149 mounted on the unified control panel 80. The pH meter 149 of the preferred embodiment is an analog meter.

Energization of the control system is effected by proper actuation of a power switch 151, which when properly actuated, applies power to the control system as indicated by an illuminated light-emitting diode 152. To reset the electronic controls of the control system, a master reset switch 154 is also provided on the unified control panel 80.

By means of the construction of the control panel 80 as shown in FIG. 5, there is achieved in the present invention a compact and yet versatile operator interface through which suitable control of the apparatus 2 can be maintained. This control is maintained primarily by entering the various concentration values in the thumbwheel switches 118, 120 for each channel control sector and by appropriately setting the manual controls via the potentiometer control knobs 132. Once these have been set and the remaining switches have been set in their selected positions, the control system controls the rate at which the pump or pumps of each channel flow their respective additives into the flows of either the water or mixture. The circuits by means of which this control is achieved are shown in FIGS. 8-16 and FIGS. 17A-D and 18A-B as will be discussed subsequently. Prior to such discussion, however, the remaining structure of the control system portion contained in the housing 56 will be described with reference to FIGS. 6 and 7.

Figure 6:
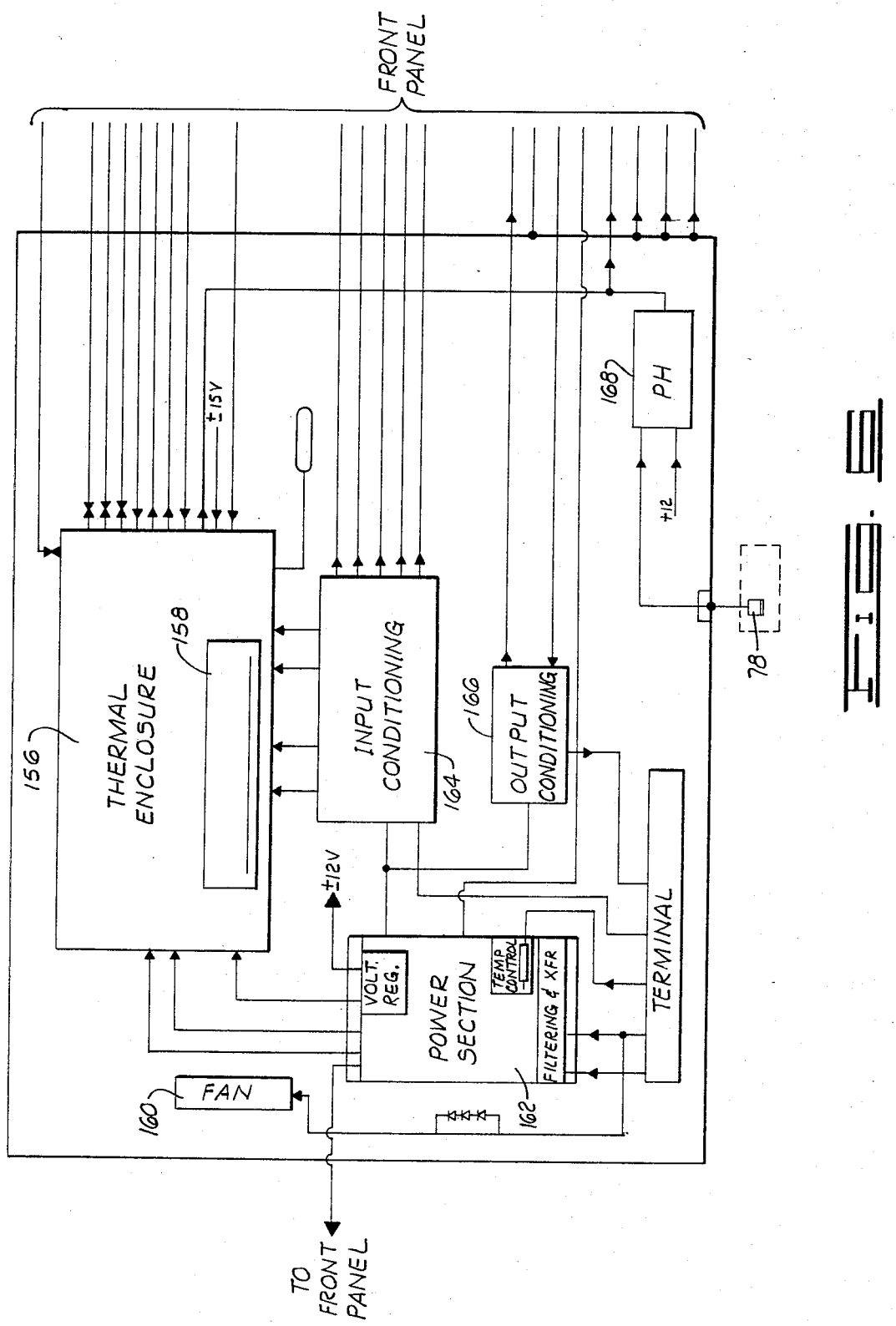
FIG. 6 is a functional block diagram of the bottom assembly associated with the unified control panel shown in FIG. 5.

In FIG. 6 there is disclosed the second level of the housing 56 which is found immediately behind the unified control panel 80. The second level includes a thermal enclosure 156 in which a microcomputer 158 of the present invention is contained. A fan 160 is used in association with the thermal enclosure to control the temperature at which the microcomputer 158 is maintained.

Figure 7:
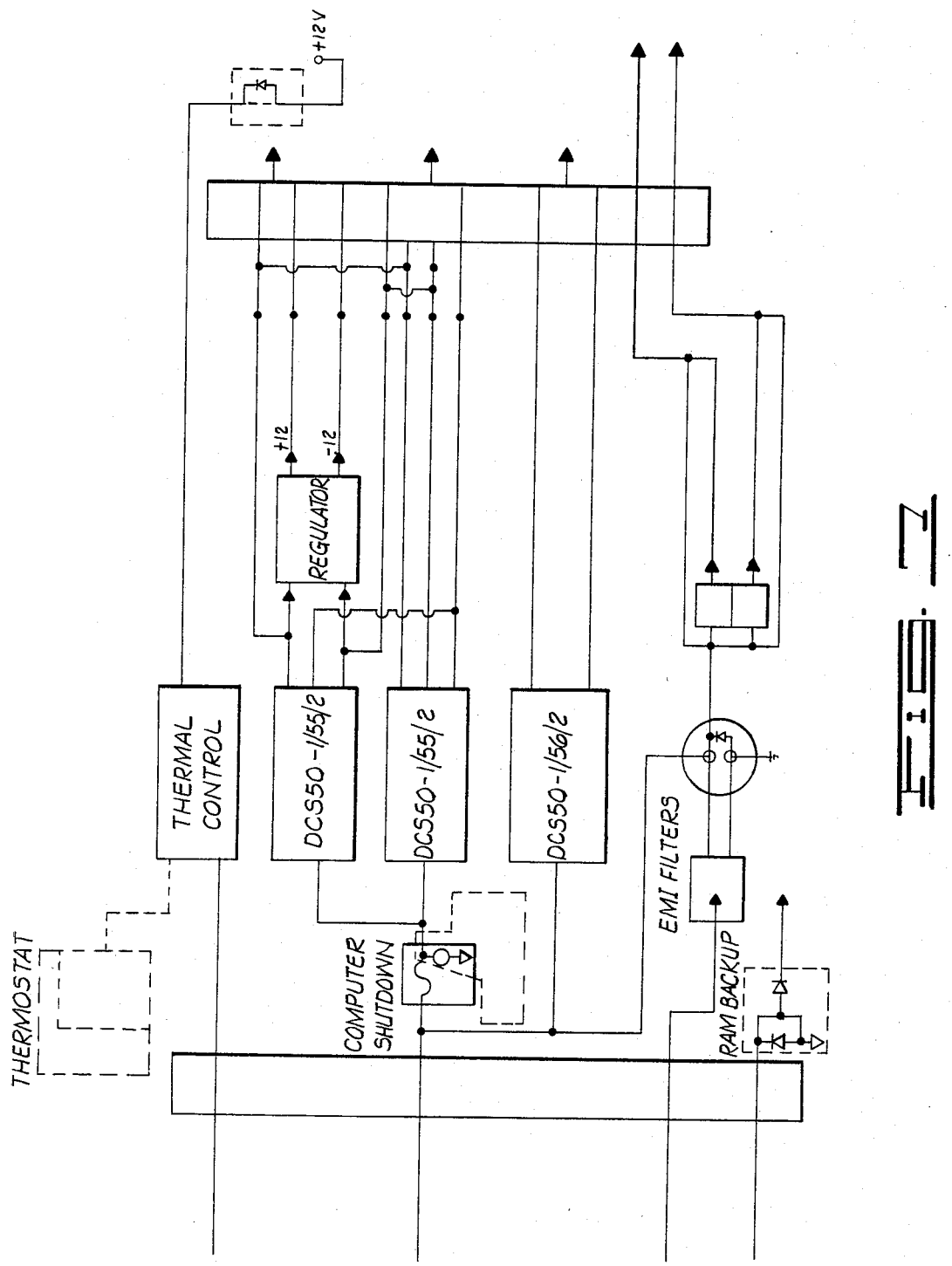
FIG. 7 is a functional block diagram of the power source assembly associated with the unified control panel shown in FIG. 5.

The second level also includes a power section 162 further illustrated in FIG. 7.

The second level also includes the printed circuit cards containing the input conditioning circuits 164 and the output conditioning circuits 166 which interface with the mechanical elements of the additive control means of each channel. The elements 164 and 166 are schematically shown in FIGS. 8-18. The second level also includes a control portion 168 of the pH detector means.

Figure 17A:
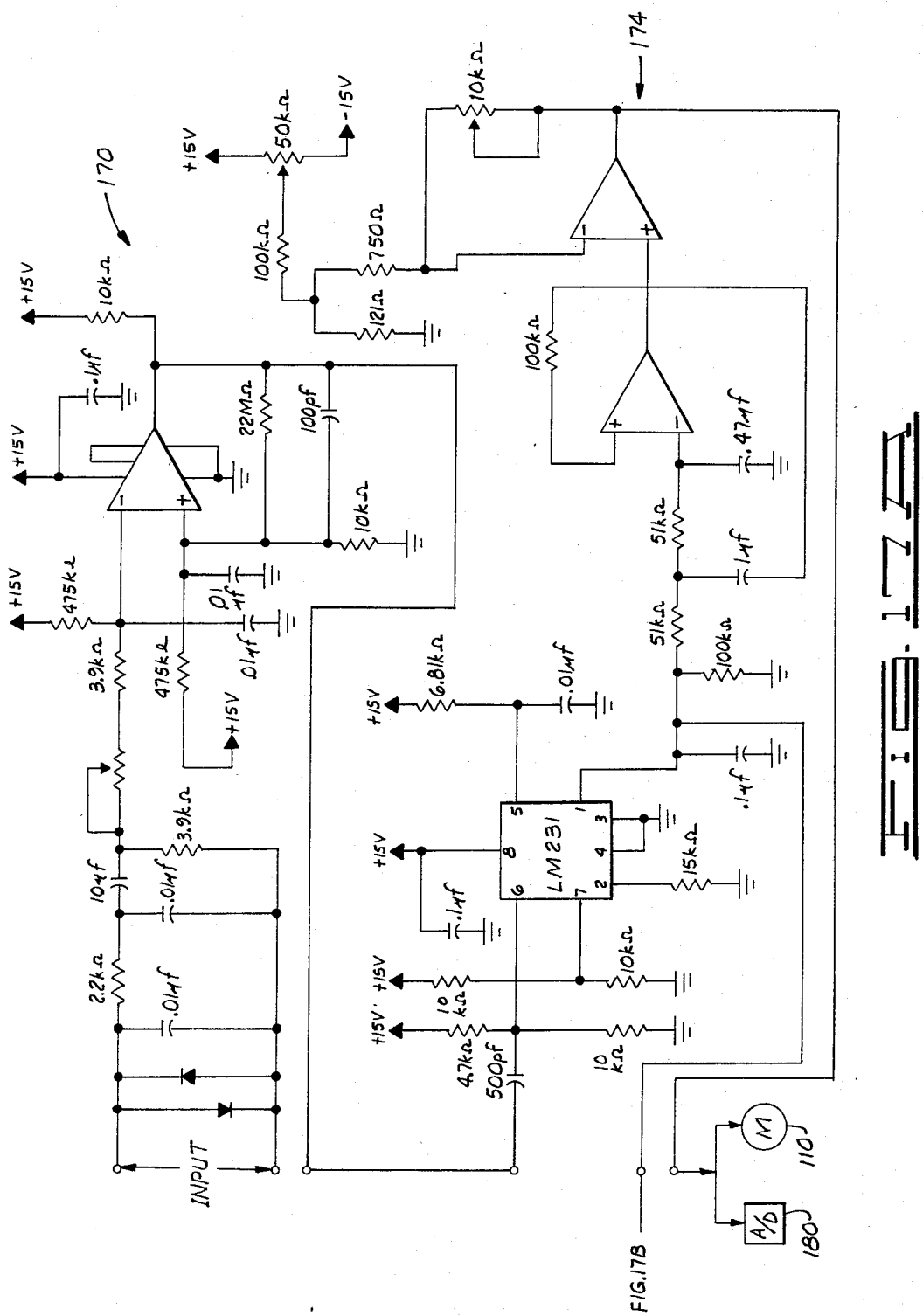
Figure 17B:
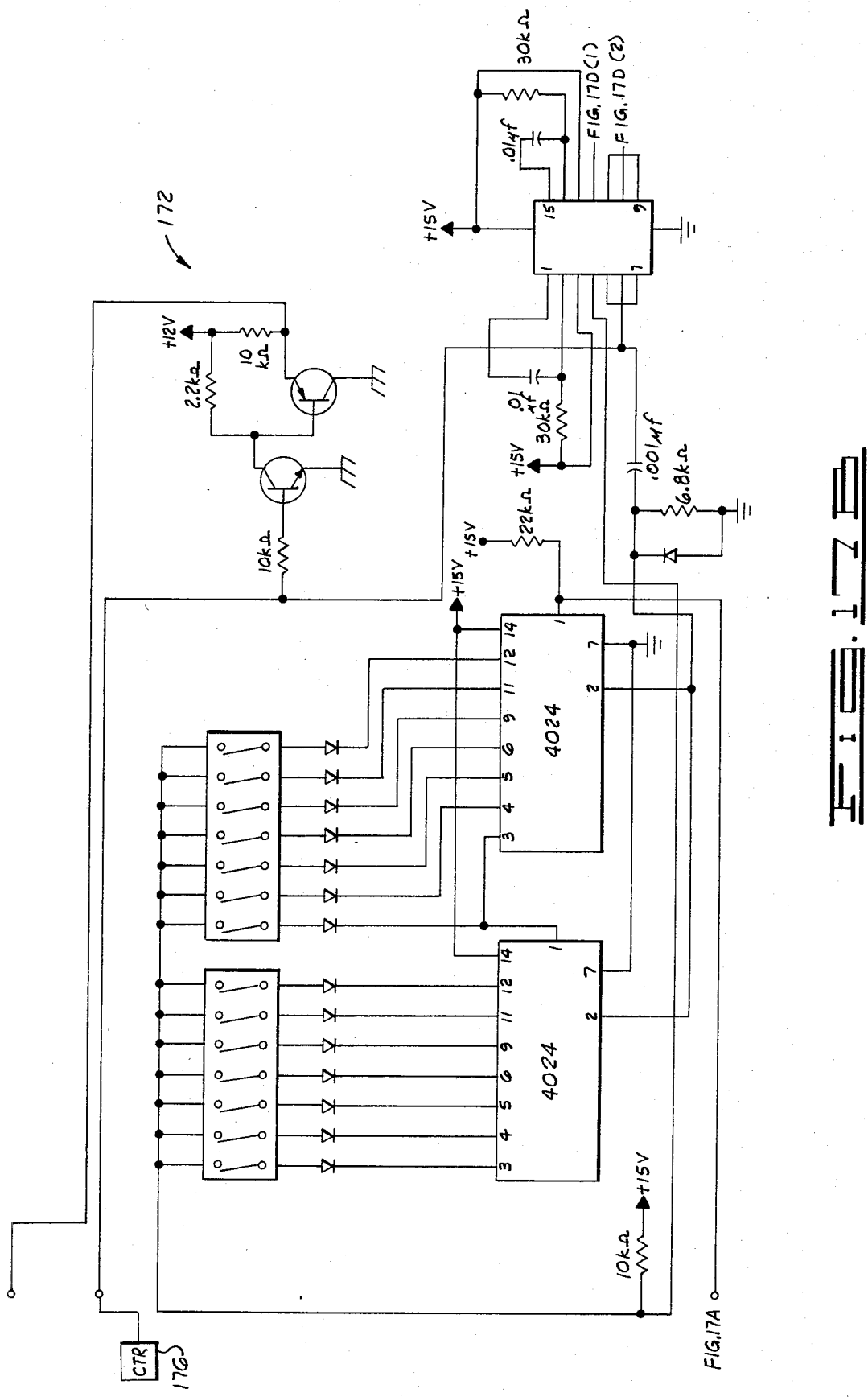

FIG. 8 discloses a functional block and schematic circuit diagram of the input circuitry for the channel control sector 82. The electrical output of the flow meter 42 is received by a dual flow circuit schematically shown in FIGS. 17A–D, which FIGS. 17A–D are believed to be self-explanatory to those having skill in the pertinent art and will not be specifically discussed. However, broadly, the dual flow circuit includes an amplify and square circuit 170 (FIGS. 17A or 17C) which receives an input from a flow meter or a tachometer (e.g., flow meter 42 as illustrated in FIG. 8) and provides an output to a percent multiplier circuit 172 (FIGS. 17B or 17D) and to a frequency-to-voltage circuit 174 (FIGS. 17A or 17C). The output of the amplify and square circuit 170 is switchably connectible to the frequency-to-voltage converter circuit 174 by means of the run/calibration switch 112a shown in FIG. 5 as a part of the calibration switch means 112.

The output from the multiplier circuit 172 is provided to a counter circuit including, in the preferred embodiment, a pulse rate board of a type as known to the art. The pulse rate board includes a plurality of counters for accumulating pulses representing the total volume detected by the flow meter 42. The output of the counter 176 is accessed over an STD bus 178 by the microcomputer 158 of the preferred embodiment.

The output from the frequency-to-voltage converter circuit 174 is provided both to the match meter 110 shown in FIG. 5 and to an analog-to-digital converter 180 which provides a digital signal to the microcomputer 158 via the STD bus 178. In the preferred embodiment the analog-to-digital converter 180 is a Data Translation DT 2742 series analog input board.

Also connected to the STD bus 178 via another analog-to-digital converter 182 is the manual control signal provided by a potentiometer 184 whose setting is controlled by the positioning of the knob 108 on the front panel 80.

The inputs from each of the switches 104, 106 and 122 of the channel control sector 82 are provided to the STD bus 178 via a parallel input circuit 186. In the preferred embodiment the parallel input circuit 186 is provided by an Intersil ISB-3310 parallel input card.

Outputs for the channel control sector 82 are provided over the STD bus 178 to the six-digit display 102. The display is driven through a 32-channel input/output board. The display means of the preferred embodiment is shown in FIGS. 18A–B.

An LED driver 190 is actuated by a suitable command from the microcomputer 158 over the STD bus 178 to illuminate a light-emitting diode 192 included in the channel control sector 82 for indicating when a flow rate has been detected by the flow meter 42.

Figure 12:
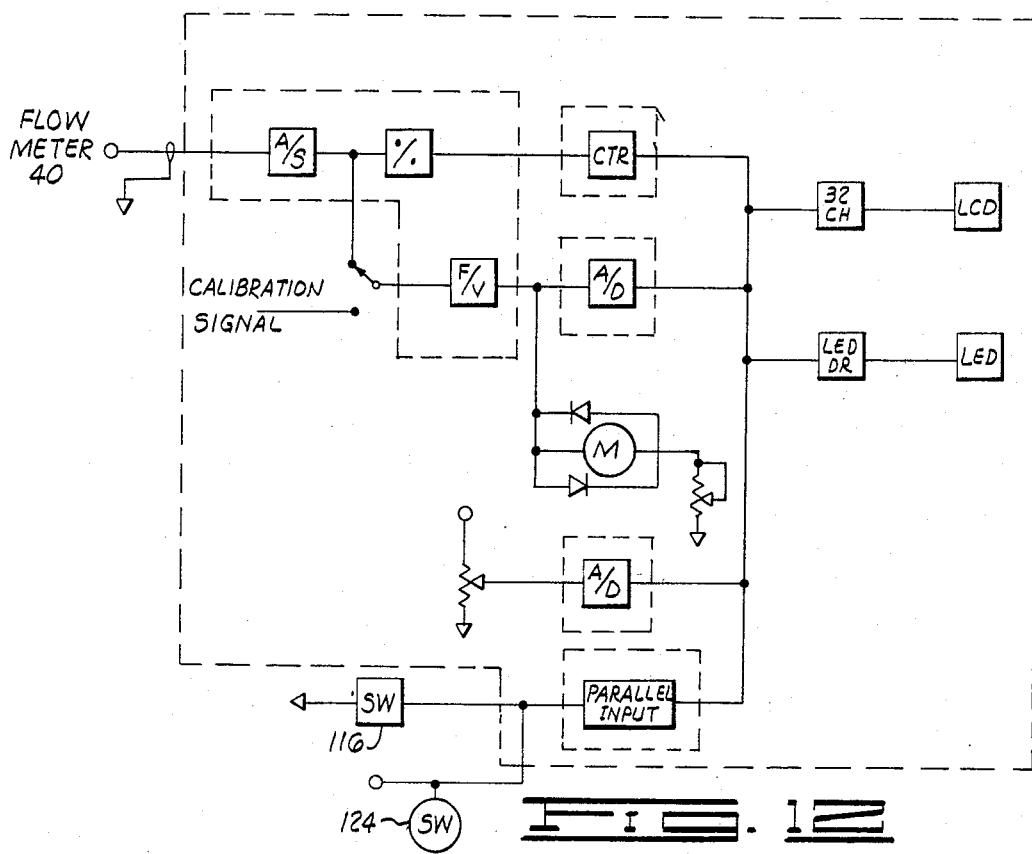
FIG. 12 is a schematic illustration of the channel 7 input and output signal flow of the preferred embodiment control system.

The channel control sector 94 of channel seven, which is associated with the flow of gel from the holding tank 16 to the blender tub 18, is constructed similarly to the channel control sector 82 as illustrated in FIG. 12; therefore, channel control sector 94 will not be further described with reference to FIG. 12.

Figure 11:
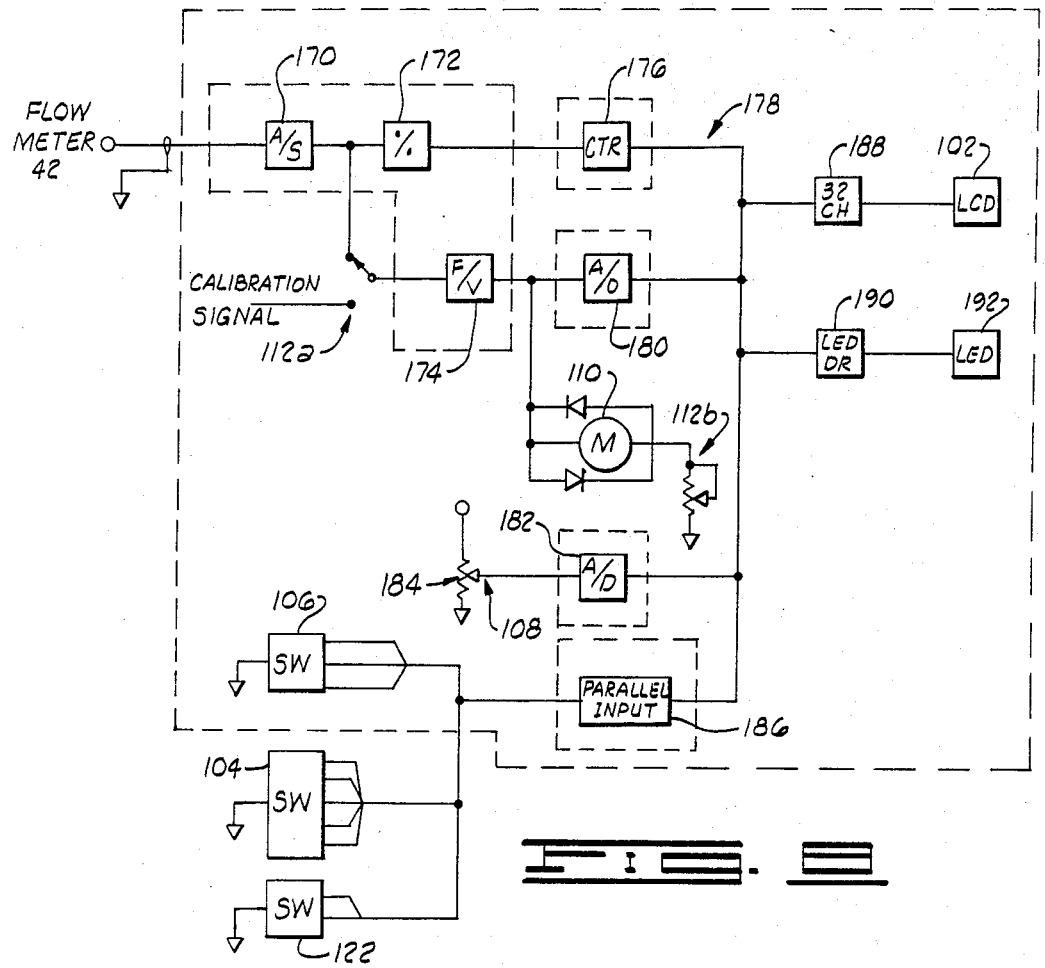
FIG. 11 is a schematic illustration of the channel 6 input signal flow of the preferred embodiment control system.
Figure 10:
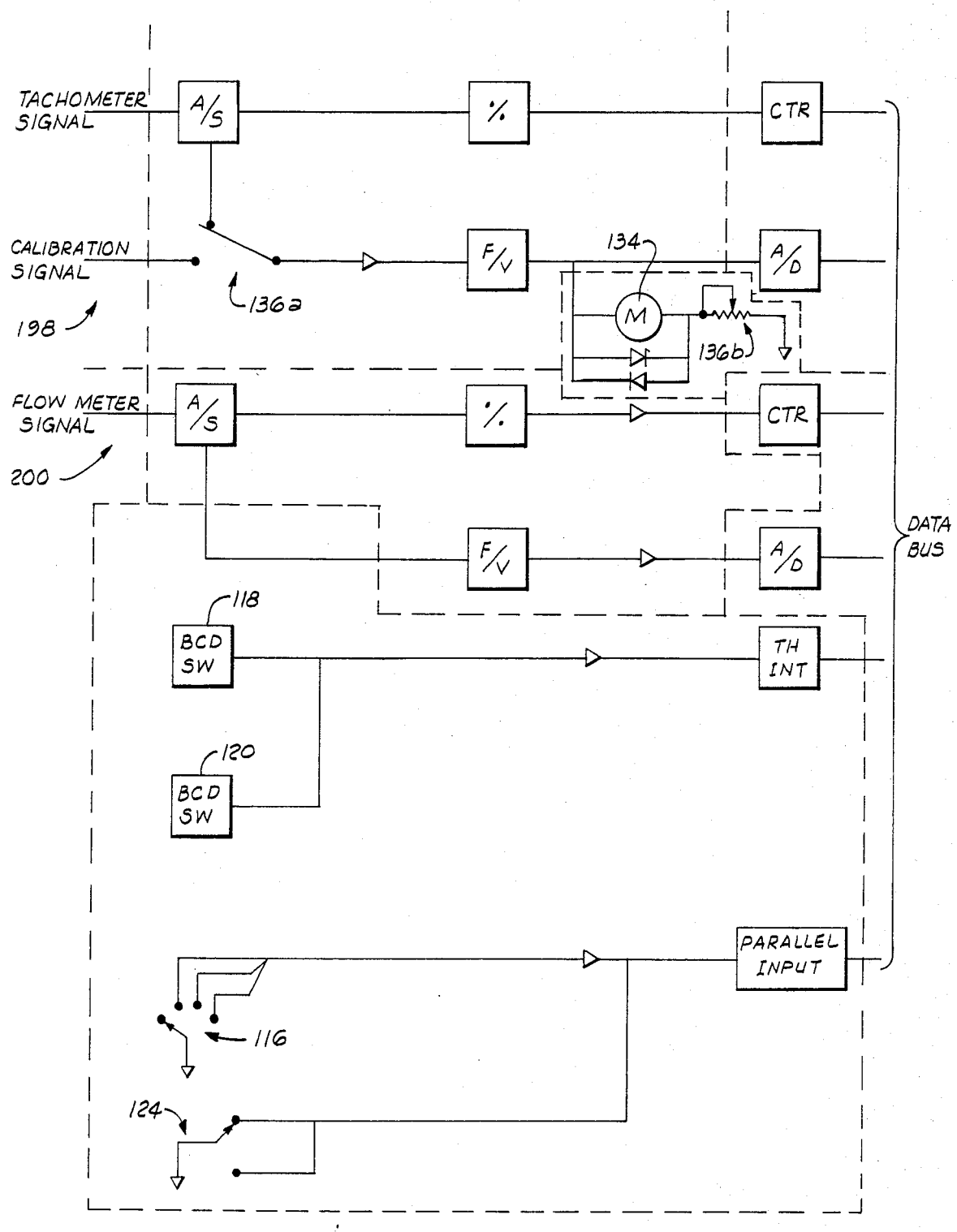
FIG. 10 is a schematic illustration of the input signal flow for one of channels 3, 4, 5, 8, 9 and 10 of the preferred embodiment control system.

FIGS. 9, 10 and 11 disclose the input circuitry for the channel control sectors 84, 86, 88, 90, 92, 96, 98 and 100. More particularly, FIG. 9 is a functional block and schematic circuit diagram of the inputs for the channel control sector 84; FIG. 10 is a functional block and schematic circuit diagram for one of the channel control sectors 86, 88, 90, 96, 98 and 100; FIG. 11 is a functional block and schematic circuit diagram of the inputs for the channel control sector 92. Each of these channel control sector inputs is constructed substantially the same; therefore, only the circuitry shown in FIG. 10 will be described. The similar circuits are appropriately labeled in each of the other drawings. However, it is to be noted that the channel control sectors 84 and 92 additionally include combinator circuits 194 and 196, respectively, for combining the signals representing the flows from each of the subchannels in the respective channels. The combinators 194 and 196 are of types known to the art. For example, one type of combinator has an analog section which sums analog signals for display or recording and a digital section which sums the output from scaling circuits. An oscillator clock controls the digital signals by gating and resetting an input storage flip-flop memory to provide an output pulse to a counter which is the sum of the input pulses.

FIG. 10 discloses that each of these additive channels includes a pump input circuit 198 and a flow meter input circuit 200, each of which is constructed similarly to the input circuitry previously described with reference to FIG. 8. The pump input circuit 198 operates in response to the electrical signal provided by the tachometer 74 of the respective channel, and the flow meter input circuit 200 operates in response to the electrical signal provided by the flow meter 76 of the respective additive channel. Each of the additive channel control sectors also includes an operator input portion which includes a parallel input circuit such as described with reference to FIG. 8, for receiving inputs from the display mode switch 116 and the pump/flow meter select switch 124 of the respective channel control sector. FIG. 10 further shows the operator input portion includes means for interfacing the data from the thumbwheel switches 118 and 120 with the data bus 178. Because duplicate elements described in FIG. 8 are found in the additive channel control sectors as shown in FIGS. 9–11, a further description of these channel control sectors will not be given.

Figure 15:
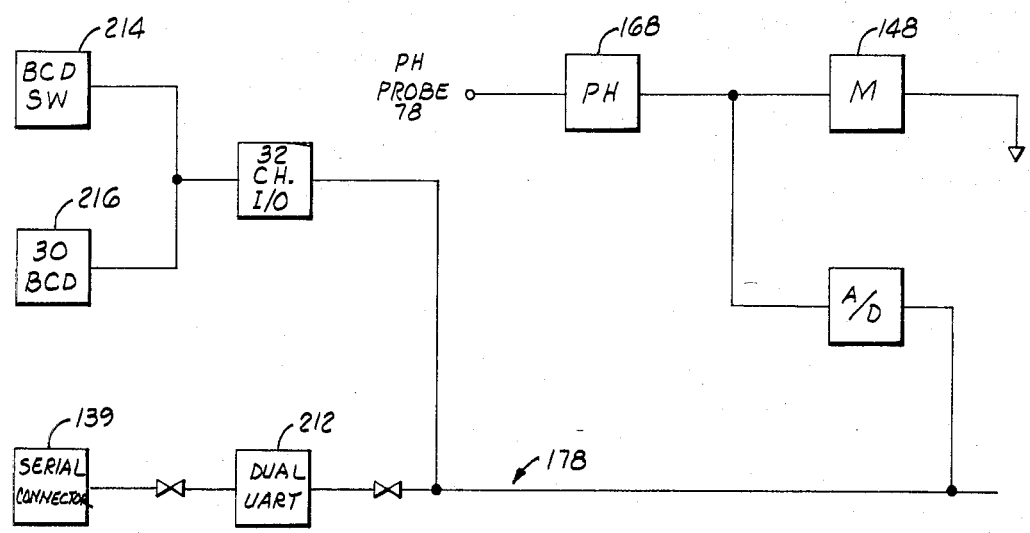
FIG. 15 is a schematic illustration of the channel 6 output signal flow of the preferred embodiment control system.

FIGS. 13, 14 and 15 are functional block and schematic circuit diagrams of the outputs of the various additive channels. FIG. 13 illustrates the output drive to each of the valves 72a, 72b and 72c associated with respective ones of the three pumps of the liquid gel concentrate channel. FIG. 15 discloses the output drive circuits for the two subchannels of the channel control sector 92 of channel six. Each subchannel illustrated in FIGS. 13 and 15 includes the elements more particularly shown in FIG. 14 which illustrates a representative one of the output circuits for the channel control sectors 86, 88, 90, 96, 98 and 100.

FIG. 14 shows the STD bus 178 communicates with the six-digit liquid crystal displays 114 of each channel control sector.

FIG. 14 discloses that the STD bus 178 also communicates with a light-emitting diode driver 202 and a light-emitting diode driver 204 for activating a respective one of the light-emitting diodes 128 when the selected pump signal or flow meter signal is indicating a minimum flow. The drivers 202 and 204 form part of the channel control sector drive portion.

The STD bus 178 also communicates with a digital-to-analog converter 206 in the drive portion of the control sector. In the preferred embodiment the D/A converter is a Data Translation DT 2726 four channel D/A converter. The D/A converter 206 provides an output which is used when the automatic/manual switch 130 is in the automatic position. When the automatic/manual switch 130 is in the manual position, it connects a potentiometer 208 which is set in response to the respective control knob 132 shown in FIG. 5. The automatic/manual switch 130 connects the selected signal to an output converter circuit 210 of a type as known to the art. In the preferred embodiment, the output converter circuit 210 converts the voltage provided through the automatic/ manual switch into a zero to 60-milliampere current signal for driving the preferred embodiment Bertea valve 72 associated with the hydraulic motor 70 of the respective additive channel. This output drive signal is provided to the valve 72 only when the pump on/off switch 126 is appropriately set.

FIG. 16 discloses that the control system also includes a dual universal asynchronous receiver/transmitter circuit, such as a Prolog 7304 dual UART card for the preferred embodiment, for providing serial communications over the STD bus 178 through the connector 139 shown in FIG. 5.

There is also shown in FIG. 16 that option switchboards 214, 216 can be connected to the STD bus 178. FIG. 16 also shows the connection of the pH probe 78, the pH electronics 168, and the pH meter 148 to the STD bus 178 via an analog-to-digital circuit as known to the art.

Figure 17:
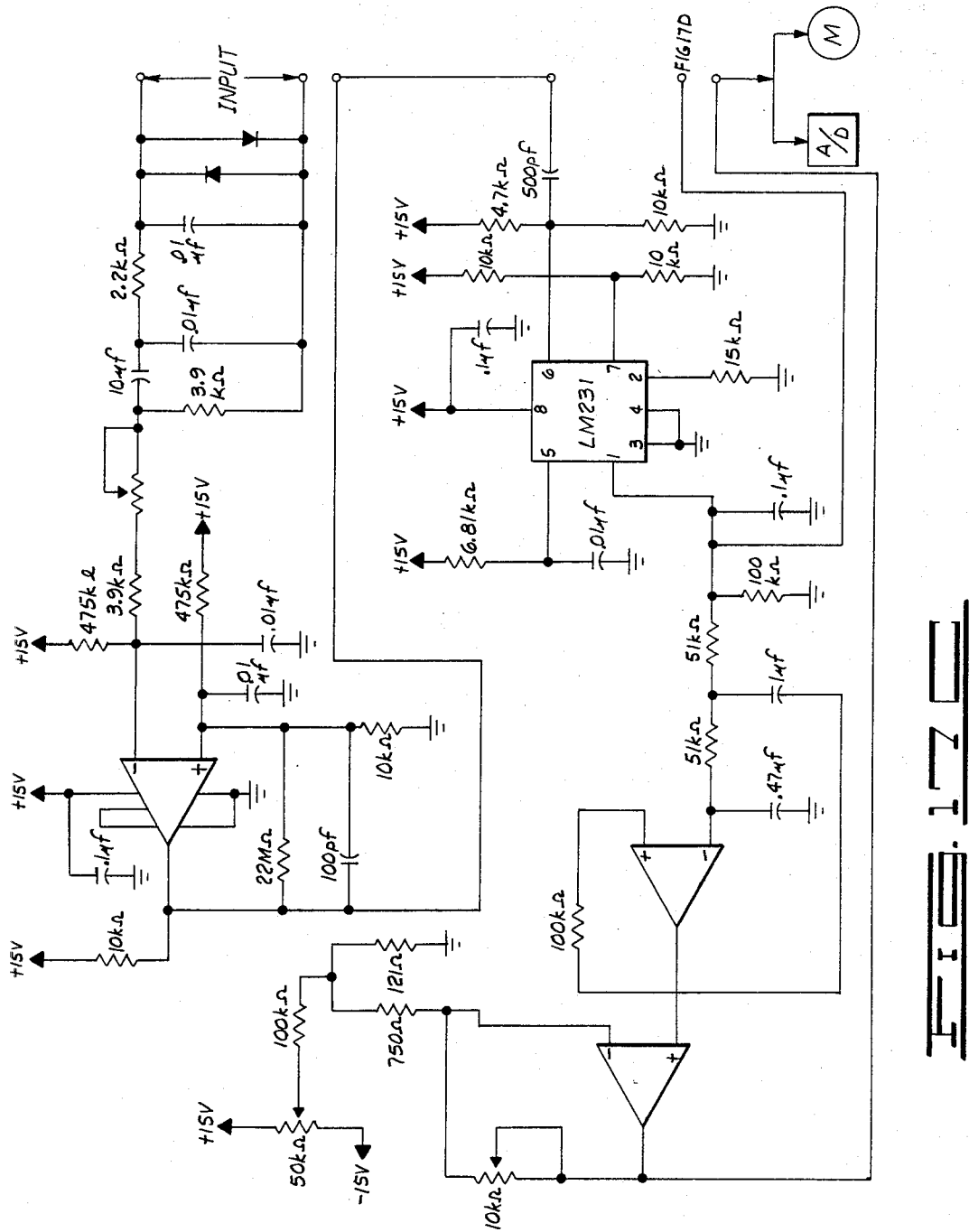
Figure 17D:
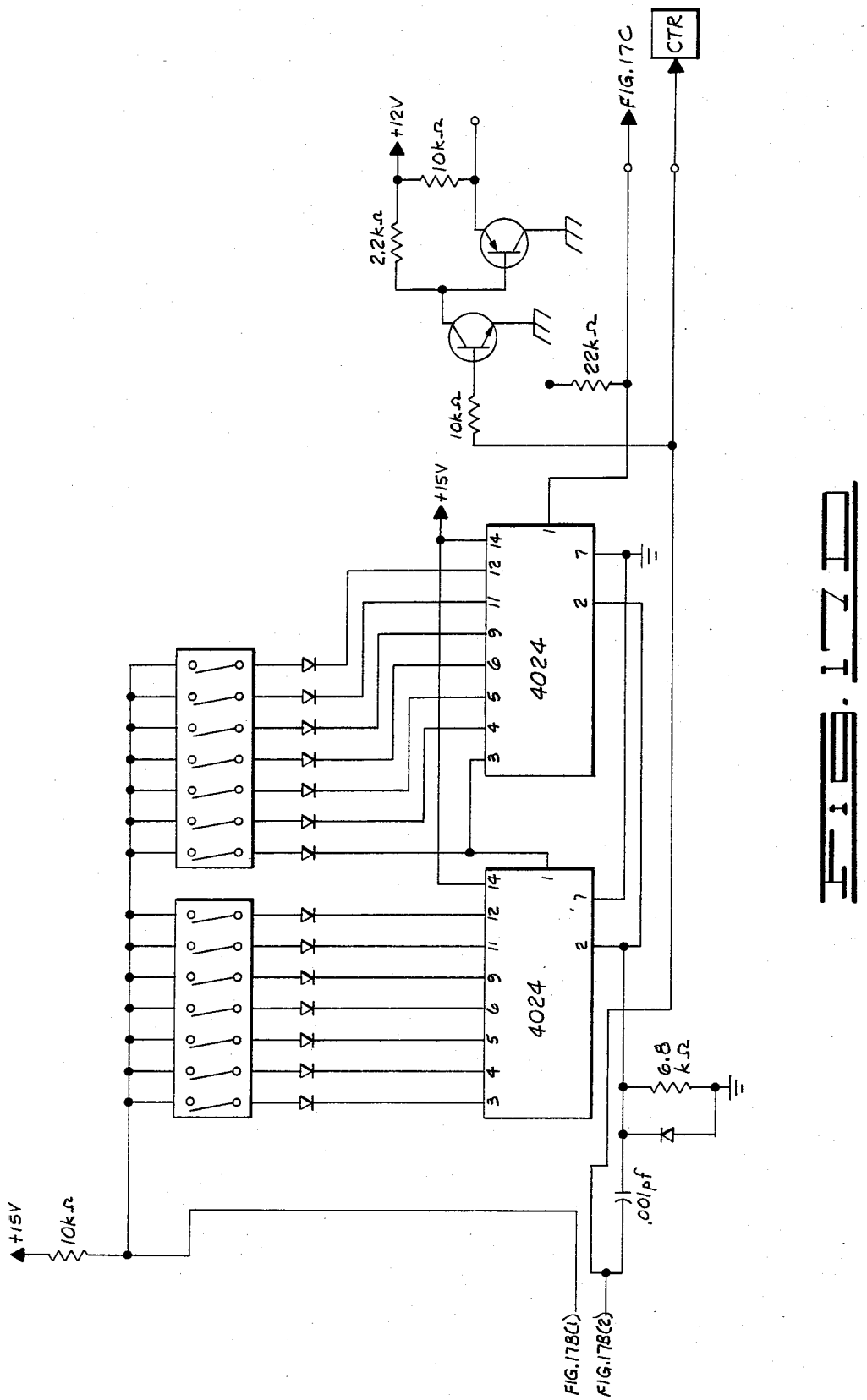

It is to be noted that the individual elements shown in FIGS. 8–16 are of types known to the art, other than those which are specifically shown in FIGS. 17 and 18.

The preferred embodiment microcomputer 158 which controls the handling of the input and output circuits shown in FIGS. 8–18 includes a Prolog 7801 central processing unit (CPU) and associated EPROM board which contains the operating program. Also associated with the CPU via the STD bus 178 are a random access memory of a type known to the art and an arithmetic card for enabling computations to be performed in floating point manner. In the preferred embodiment, the arithmetic card is an Intersil ISB-3600 arithmetic card. These elements are constructed and interconnected in a manner as known to the art for communicating over the STD bus 178 with each other and with the various elements previously described.

With reference to FIGS. 19 and 20, the preferred embodiment program contained in the EPROM board for controlling the operation of the CPU will be described. FIG. 19 discloses the flow chart of the main loop program for controlling the operation of each channel.

The main loop program first calls an initialization subroutine which zeros all of the random access memories, displays and drives and which otherwise initializes the system as known to the art.

Next, the main loop program enters a subroutine LEDLIT which lights the front panel light-emitting diodes 128 for each channel having a detected flow rate above a preset "no-flow" value. This illumination notifies an operator that a flow below a minimum value has been detected by the flow meter of that channel which is a check against the digital display that might be indicating a flow rate in response to the tachometer signal, which tachometer signal might indicate a flow because the associated pump is operating even though no fluid may be being pumped by the pump.

The next subroutine of the main loop program is the subroutine LDRR. This subroutine loads the concentration ratios entered in the thumbwheel switches 118 and 120. Only those concentration values of the stage of thumbwheel switches which has been selected by the switch 122 are entered.

The next subroutine is a subroutine GRATE which is used to compute the actual rate calculations for each channel. This is done by accessing the digital voltages from each of the analog-to-digital converters, such as the analog-to-digital converter 180 shown in FIG. 8. The subroutine GRATE also retrieves the accumulated digitized pulse counts from the counters 176 of each of the channels. Utilizing the raw voltage data from the analog-to-digital converters, the control means of the present invention can determine the rate of flow in each channel; utilizing the accumulated pulses from each of the counters, the control means can determine the total volume of additive which has flowed, These determinations are made by the microcomputer 158 in a manner as known to the art.

After the subroutine GRATE, the main program loop enters the subroutine SERV1 which services channel one, the primary flow channel with which the channel control sector 82 is associated. The subroutine SERV1 checks the front panel switch 104 to determine which display mode has been selected. If the total rate display mode has been selected, the subroutine controls the microcomputer to correct the computed actual total rate for proper units. If the total volume is to be displayed, the microcomputer checks to determine if the master reset switch 154 has been actuated thereby indicating that the volumetric measurements are to be reset to zero. If the base fluid rate has been selected, the microcomputer corrects for the proper units. If the base fluid volume has been selected for display, the reset switch is checked. Whichever type of information is to be displayed, the binary representation thereof obtained in the microcomputer is converted to binary coded decimal and displayed in the digital display 102.

Upon completion of the subroutine SERV1, the main loop enters the subroutine SERV2 which has a flow chart disclosed in FIG. 20. From the flow chart, it is apparent that the subroutine SERV2 is the portion of the main loop program which provides the output drive signal to the Bertea valves 72a, 72b and 72c of channel two. This is done by obtaining the concentration ratio for channel two as entered in the selected thumbwheel switch 118 or 120. The concentration ratio is converted from BCD to binary to floating point for use by the Intersil arithmetic card. Next, the stored signal representative of the actual flow rate of channel one, which signal is the one to which each of the additives is slaved in the preferred embodiment, is obtained. This actual flow rate is multiplied by the entered concentration ratio to yield a product which is then divided by a ratio unit to get the desired flow rate. A feedback signal representing the actual flow rate of the additive of channel two is obtained and subtracted from the desired flow rate to derive a flow error. The flow error is scaled for proper units and then multiplied by a K scaling factor to obtain a control error. The control error is converted to binary and added to the accumulated output drive signal which has been used to previously drive the pumps of channel two. This sum is output through the digital-to-analog converter and the output converter to the appropriate valve as illustrated in FIG. 13. The subroutine then checks the display mode switch 116 to determine which display mode has been selected. If rate is to be displayed, it is corrected for units; if volume is to be displayed, a check for a master reset is made; and if the ratio is to be displayed, the rate signal is divided by the slave signal (e.g., the actual flow rate of channel one) to which the additive is slaved and corrected for units. The appropriate number to be displayed is then converted to BCD and output to the digital display 114.

The subroutines SERV3, 4, 5, 6, 8, 9 and 10 are similar to the subroutine SERV2; however, they are used to control the operation of channels three, four, five, six, eight, nine and ten, respectively. The algorithm for the preferred embodiment control provided by each of the subroutines SERV2-6, 8-10 can be mathematically defined by the following equation:

new drive output signal = old drive control signal
+ [typ × K (RR/RRU × slave − feedback)]

where:
"new drive output" = the corrected output drive signal;
"old drive control signal" = the previous output drive signal which is to be corrected if the desired flow rate does not equal the actual flow rate;
"typ" = a conversion factor to change gallons per minute to a pure binary number;
"K" = the K factor which is manually entered by a switch to achieve a stable system (it is a number that has a value of 0.1 to 1.0 in 0.1 increments for the preferred embodiment);
"RR" = the desired concentration ratio in gallons which has been entered in the front panel thumbwheel switches;
"RRU" = the units of the concentration ratio (e.g., 1, 10, 100, 1,000 or 10,000 gallons);
"slave" = the signal to which the additive control is slaved, which is usually either the base fluid or total flow rate in gallons per minute; and
"feedback" = the signal from the feedback source in gallons per minute, usually the actual flow rate of the additive.

Utilizing this algorithm, the system can become over or underdamped by picking a K value either too small or too large. If the K value is too large, the response will be underdamped. This makes the response of the system much faster, but a system that has a non-linear response could go into oscillations and never attain adequate control. If the K factor is picked too small, the system could be overdamped. This would mean that the response is so slow that control is never adequately attained. The specific value of this factor is determined based on the particular mechanical system with which the control means is used.

Additionally, with this algorithm, the actual flow cannot be sampled any faster than the control system response time. If faster sampling occurred, the response would be repeatedly changed before it would have time to respond to a prior change.

The subroutine SERV7 is similar to the subroutine SERV1; however, the subroutine SERV7 is used to monitor the other master flow from the holding tank 16 to the blender tub 18 which is used to control the additives of channels eight, nine and ten.

After the subroutine SERV10 is completed, the main loop enters the subroutine DAMP. This subroutine gives the system the ability to variably set a time delay in the main loop. The delay is used to insure that the actual flow rate of a channel is not sampled at a faster rate than the control means can respond to correct the output drive signal. This insures that the correction for the output drive is not changed before the prior output drive has had time to function.

The last subroutine of the main loop is the subroutine MSTRST which checks for actuation of the master reset switch 154 on the front panel 80. If the switch is actuated, the random access memories are zeroed.

To utilize the preferred embodiment, the trailer 24 is moved to a well site where it is connected to the water source 4, the liquid gel concentrate source 6, and the blender apparatus 8. The concentration values are entered in the appropriate thumbwheel switches 118 and/or 120, the manual control (if desired) is set via the control knobs 132, and the automatic/manual switch 130 placed in the appropriate position for each channel. The pumps 68 which are to be utilized are connected to the control system by appropriate actuation of the pump select switches 126 at the right-hand portion of the control panel 80. The display mode is also selected by the appropriate switch 116. Power is applied via the power switch 150 so that the control means commences control of the various additive channels. Control is achieved as described hereinabove.

Thus, the present invention is well adapted to carry out the objects and attain the ends and advantages mentioned above as well as those inherent therein. While a preferred embodiment of the invention has been described for the purpose of this disclosure, numerous changes in the construction and arrangement of parts can be made by those skilled in the art, which changes are encompassed within the spirit of this invention as defined by the appended claims.

What is claimed is:

1. An apparatus for controlling the addition of a substance to a primary flow, comprising:
conduit means for providing a path for said primary flow;
additive means for flowing said substance into said conduit means;
First detector means for detecting a rate of said primary flow;
second detector means for detecting a rate of said substance when said additive means flows said substance into said conduit means, said second detector means including:
speed detector means for detecting a speed rate at which said additive means is operating; and
flow detector means for detecting a flow rate of said substance; and
control means, responsive to said first detector means and said second detector means, for controlling said additive means, said control means including a unified control panel comprising:
a channel control sector including:
first data entry means for manually entering a first data number specifying a first magnitude of an additive substance flow rate determining parameter for use by said control means in controlling said additive means;
second date entry means for manually entering a second data number specifying a second magnitude of said additive substance flow rate determining parameter for use by said control means in controlling said additive means; and
means for directing said control means to use either said speed rate or said flow rate for controlling said additive means; and
means for selectably directing said control means to utilize either said first data number or said second data number in controlling said additive means.

2. An apparatus as defined in claim 1, wherein:

said channel control sector further includes variable resistance means for manually controlling an electrical signal usable by said control means in controlling said additive means;

said control means further includes:
automatic means for controlling said additive means in response to said first detector means, said second detector means and the selected one of said first or second data numbers; and
manual means for controlling said additive means in response to said first detector means and said variable resistance means; and said channel control sector further includes means for electrically connecting either said automatic means or said manual means to said additive means.

3. An apparatus as defined in claim 2, wherein:
said apparatus further comprises temperature means for controlling the temperature of said control means; and
said unified control panel further includes means for selectably operating said temperature means in either a heating mode or a cooling mode.

4. An apparatus as defined in claim 3, wherein:
said apparatus further comprises pH detecting means for detecting the pH of a mixture resulting from the addition of said substance to said primary flow; and
said unified control panel further includes indicator means, responsive to said pH detecting means, for visually indicating the pH of said mixture.

5. An apparatus for adding substances to a first flow of a fluid and to a second flow of a mixture, said apparatus comprising:
first conduit means for providing a flow path for said first flow;
first detector means for detecting a rate of said first flow;
first additive means for flowing a first one of said substances into said first conduit means;
second detector means for detecting a rate associated with said first additive means;
second additive means for flowing a second one of said substances into said first conduit means;
third detector means for detecting a rate associated with said second additive means;
second conduit means, associated with said first conduit means, for providing a flow path for said mixture, said mixture including said fluid, said first substance and said second substance;
fourth detector means for detecting a rate of said mixture when said mixture flows along said flow path provided by said second conduit means;
third additive means for flowing a third one of said substances into said second conduit means;
fifth detector means for detecting a rate associated with said third additive means; and
control means for controlling, in response to said first detector means, said second detector means, and said third detector means, said first additive means and said second additive means, and for controlling, in response to said fourth detector means and said fifth detector means, said third additive means, said control means including a single control panel including:
a first channel control sector comprising first display means for displaying said detected rate of said first flow;
a second channel control sector comprising:
first data entry means for entering first numerical data pertaining to the control of said first additive means; and
first variable means for adjustably setting a first electrical signal;
a third channel control sector comprising:
second data entry means for entering second numerical data pertaining to the control of said second additive means; and
second variable means for adjustably setting a second electrical signal;
a fourth channel control sector comprising second display means for displaying said detected rate of said mixture; and
a fifth channel control sector comprising:
third data entry means for entering third numerical data pertaining to the control of said third additive means; and
third variable means for adjustably setting a third electrical signal;
automatic means, responsive to said first numerical data, said second numerical data, and said third numerical data, for providing first, second and third automatic control signals for controlling said first additive means, said second additive means, and said third additive means, respectively;
manual means, responsive to said first electrical signal, said second electrical signal, and said third electrical signal, for providing first, second and third manual control signals for controlling said first additive means, said second additive means, and said third additive means, respectively;
said second channel control sector further comprising first switch means for electrically connecting said first automatic control signal to said first additive means when said first switch means is in a first actuation state and for electrically connecting said first manual control signal to said first additive means when said first switch means is in a second actuation state;
said third channel control sector further comprising second switch means for electrically connecting said second automatic control signal to said second additive means when said second switch means is in a first actuation state and for electrically connecting said second manual control signal to said second additive means when said second switch means is in a second actuation state; and
said fifth channel control sector further comprising third switch means for electrically connecting said third automatic control to said third additive means when said third switch means is in a first actuation state and for connecting said third manual control signal to said third additive means when said third switch means is in a second actuation state.

6. An apparatus as defined in claim 5, wherein
said second channel control sector further includes fourth data entry means for entering fourth numerical data pertaining to the control of said first additive means;
said third channel control sector further includes fifth data entry means for entering fifth numerical data pertaining to the control of said second additive means;
said fifth channel control sector further includes sixth data entry means for entering sixth numerical data pertaining to the control of said third additive means; and said single control panel further includes fourth switch means for electrically connecting said first data entry means, said second data entry means and said third data entry means to said automatic means when said fourth switch means is in a first actuation state and for electrically connecting said fourth data entry means, said fifth data entry means and said sixth data entry means to said automatic means when said fourth switch means is in a second actuation state.

7. An apparatus as defined in claim 6, wherein:
said first additive means includes:
first pump means for flowing said first substance; and
second pump means for flowing said first substance;
said second detector means includes:
first speed detector means for detecting the speed of said first pump means;
second speed detector means for detecting the speed of said second pump means;
first flow meter means for detecting the flow rate of said flow of said first substance provided by said first pump means; and
second flow meter means for detecting the flow rate of said flow of said first substance provided by said second pump means; and
said second channel control sector further comprises:
fifth switch means for controlling whether said first pump means is to be used to pump said first substance into said first conduit means;
sixth switch means for controlling whether said second pump means is to be used to pump said first substance to said first conduit means; and seventh switch means for indicating to said automatic means whether said first and second speed detector means or said first and second flow meter means are to be used in computing said first automatic control signal.

8. An apparatus as defined in claim 7, wherein each of said second, third and fifth channel control sectors includes:
means for indicating the name of the substance whose flow is controlled by the respective channel control sector; and
means for indicating the units of the numerical data entered in said data entry means of the respective channel control sector.

9. An apparatus as defined in claim 5, wherein said first additive means includes:
first pump means for flowing said first substance; and
second pump means for flowing said first substance;
said second detector means includes:
first speed detector means for detecting the speed of said first pump means;
second speed detector means for detecting the speed of said second pump means;
first flow meter means for detecting the flow rate of said flow of said first substance provided by said first pump means; and
second flow meter means for detecting the flow rate of said flow of said first substance provided by said second pump means; and
said second channel control sector further comprises:
fourth switch means for controlling whether said first pump means is to be used to pump said first substance into said first conduit means;
fifth switch means for controlling whether said second pump means is to be used to pump said first substance to said first conduit means; and
sixth switch means for indicating to said automatic means whether said first and second speed detector means or said first and second flow meter means are to be used in computing said first automatic control signal.

10. A method for controlling an additive means, being driven by a drive signal, for adding an additive to a flowing fluid utilizing control means having a front panel, said front panel including a numerical entry switch having an additive concentration value entered therein, said control means also having first voltage means for providing a first voltage corresponding to the flow rate of said fluid, and said control means also having second voltage means for providing a second voltage corresponding to the flow rate of said additive, said method comprising the steps of:
storing said concentration value in a random access memory;
converting said first voltage into a first digitally encoded number indicating the actual flow rate of said fluid;
storing said first digitally encoded number in said random access memory;
converting said second voltage into a second digitally encoded number indicating the actual flow rate of said additive;
storing said second digitally encoded number in said random access memory;
using said concentration value and said first digitally encoded number from said random access memory to define a product representing a desired flow rate at which said additive is to be added to said fluid;
using said product and said second digitally encoded number to define a scaled difference representing an error between said actual flow rate of said additive and said desired flow rate of said additive;
manually entering data to define a factor having a magnitude less than one;
multiplying said error by said factor; and
adding said control error to said drive signal for providing an adjusted drive signal to drive said additive means at an adjusted speed for incrementally adjusting said actual flow rate of said additive toward said desired flow rate.

* * * * *